(12) United States Patent
Asakura et al.

(10) Patent No.: US 10,360,930 B1
(45) Date of Patent: Jul. 23, 2019

(54) DISK DEVICE AND METHOD OF MANUFACTURING DISK DEVICE

(71) Applicants: Kabushiki Kaisha Toshiba, Minato-ku, Tokyo (JP); Toshiba Electronic Devices & Storage Corporation, Minato-ku, Tokyo (JP)

(72) Inventors: Makoto Asakura, Bunkyo Tokyo (JP); Naoki Tagami, Yokohama Kanagawa (JP); Takeyori Hara, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/116,304

(22) Filed: Aug. 29, 2018

(30) Foreign Application Priority Data

Jan. 26, 2018 (JP) .................................. 2018-011981
Aug. 3, 2018 (JP) .................................. 2018-147140

(51) Int. Cl.
    *G11B 5/596* (2006.01)
    *G11B 5/58* (2006.01)
    *G11B 5/127* (2006.01)
    *G11B 5/82* (2006.01)

(52) U.S. Cl.
    CPC .............. *G11B 5/127* (2013.01); *G11B 5/82* (2013.01); *G11B 2220/2516* (2013.01)

(58) Field of Classification Search
    CPC ... G11B 20/12; G11B 15/087; G11B 5/59633; G11B 5/58; G11B 5/59688; G11B 5/5543
    USPC .......... 360/48, 72.2, 75, 77.01, 77.05, 78.14
    See application file for complete search history.

(56) References Cited

U.S. PATENT DOCUMENTS

| 7,324,300 | B2 | 1/2008 | Hara |
| 7,885,026 | B2 * | 2/2011 | Lee ..................... G11B 5/59688 360/135 |
| 9,013,824 | B1 | 4/2015 | Guo et al. |
| 9,123,369 | B2 | 9/2015 | Oberg et al. |
| 9,384,767 | B2 | 7/2016 | Oberg et al. |
| 9,792,939 | B2 | 10/2017 | Mendonsa et al. |
| 2015/0332719 | A1 | 11/2015 | Mendonsa et al. |

* cited by examiner

*Primary Examiner* — Nabil Z Hindi
(74) *Attorney, Agent, or Firm* — White & Case LLP

(57) ABSTRACT

According to one embodiment, in a disk device, the head includes a first read element and a second read element. The disk medium is partitioned into a plurality of zones. The plurality of zones include a first zone and a second zone. The first zone includes a plurality of tracks on each of which a servo area and a data area are placed, a servo burst region in the servo area from which to detect the amount of off-track of the head from the center of a track, having a first bit length. The second zone includes a plurality of tracks on each of which a servo area and a data area are placed, a servo burst region in the servo area from which to detect the amount of off-track of the head from the center of a track, having a second bit length shorter than the first bit length.

20 Claims, 27 Drawing Sheets

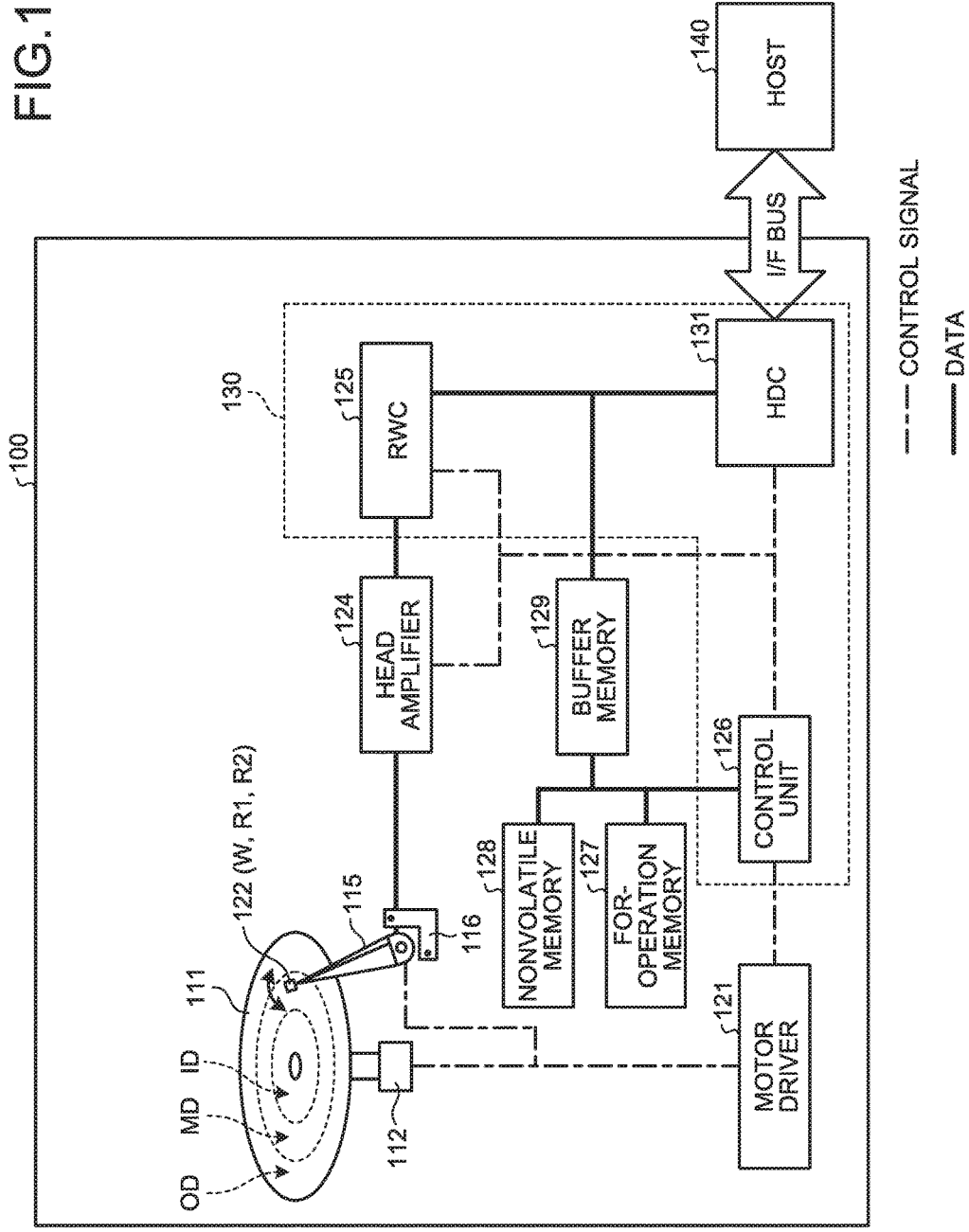

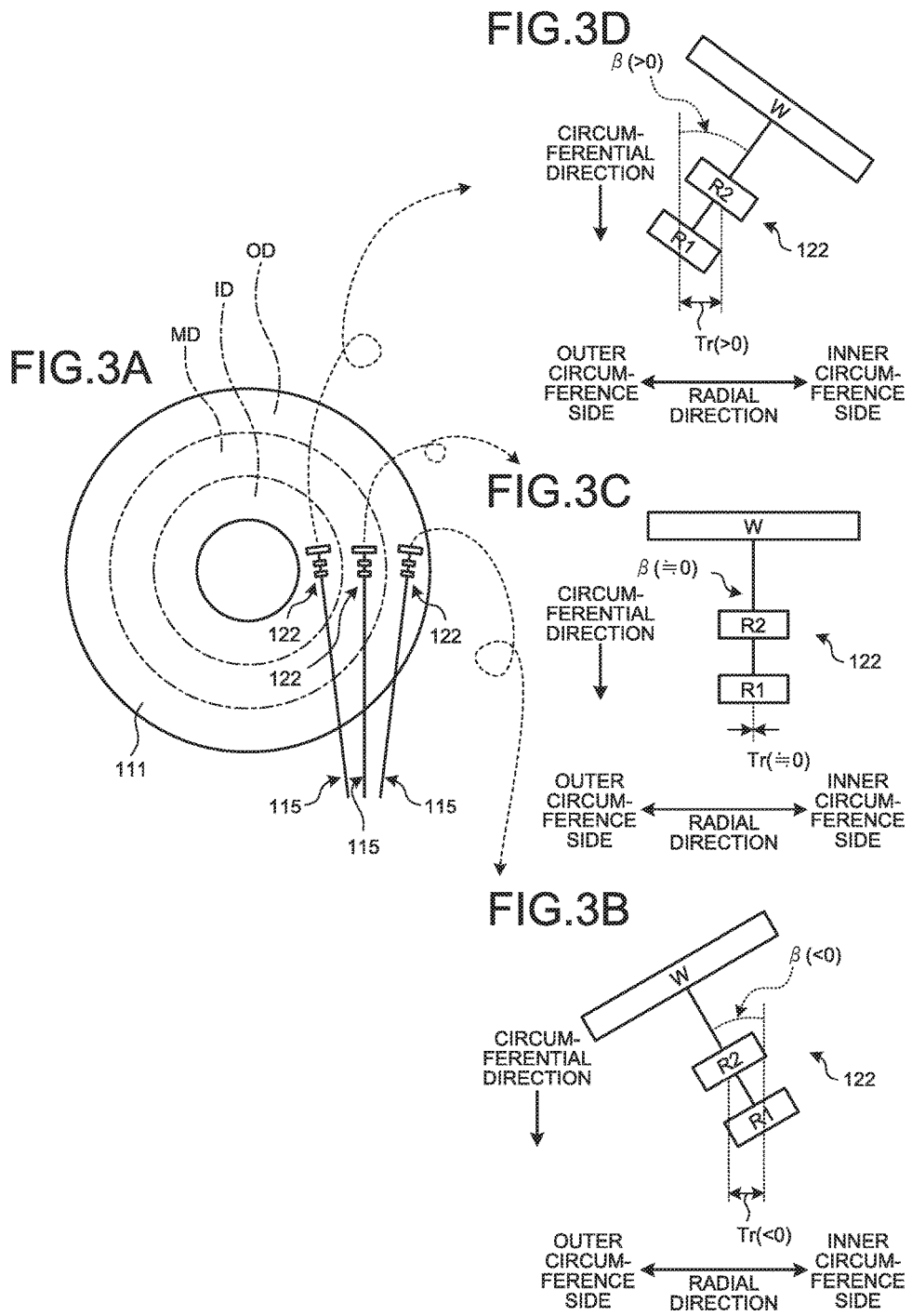

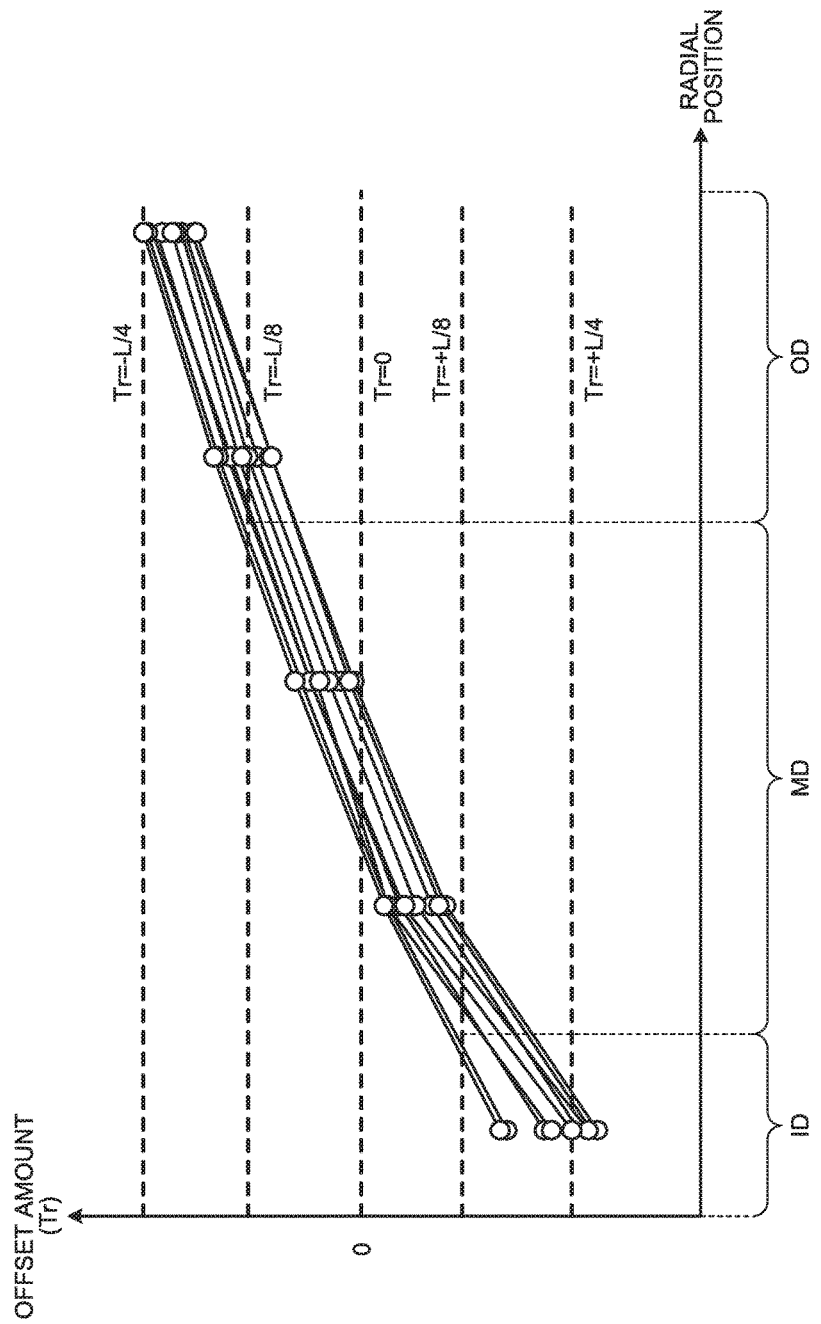

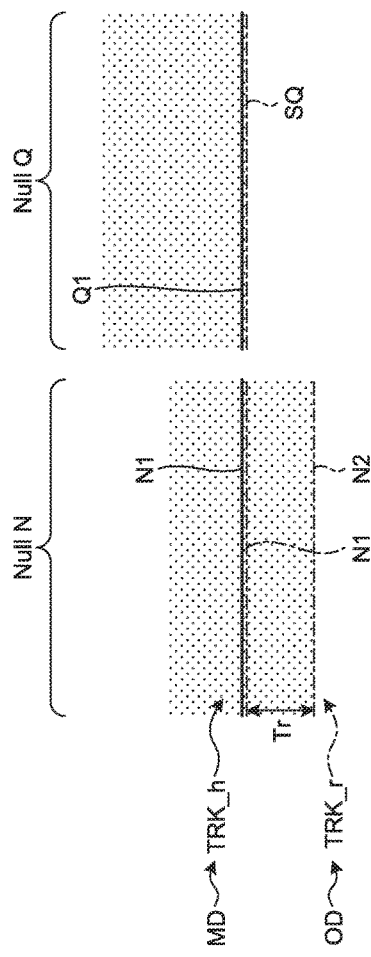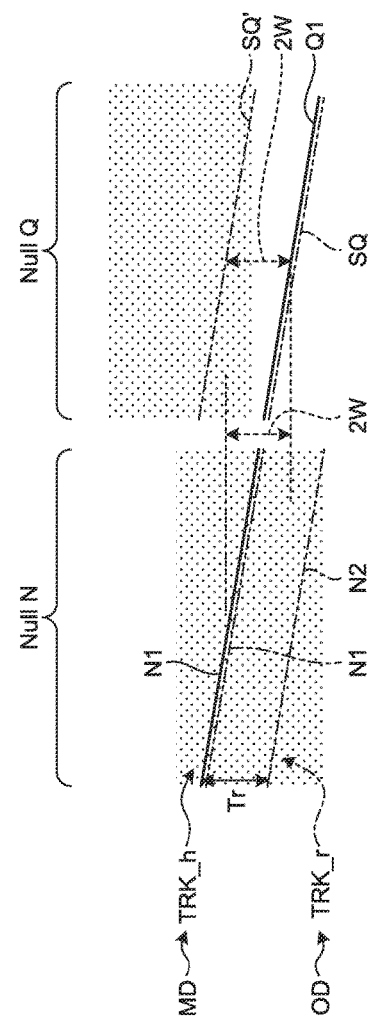

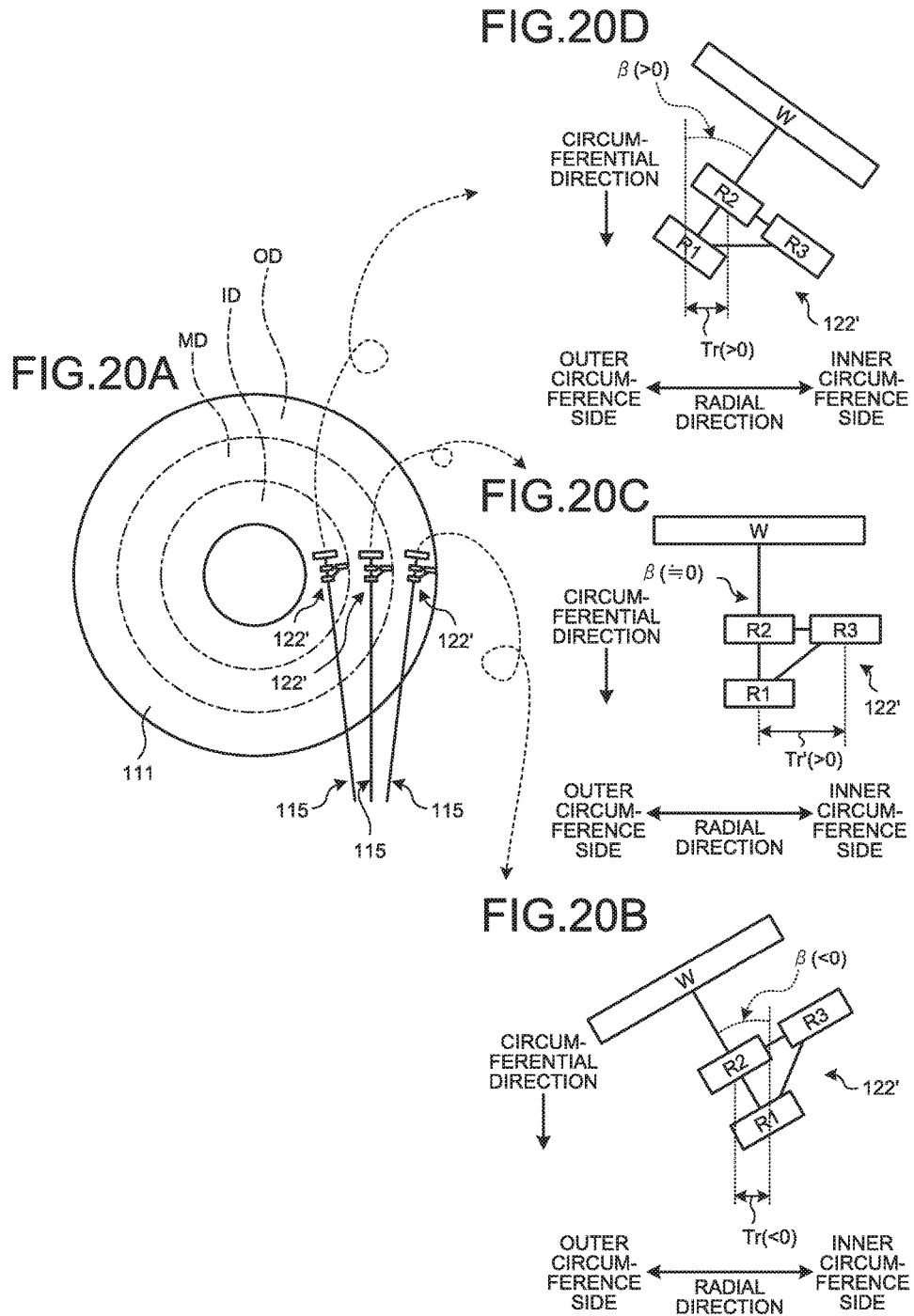

US 10,360,930 B1

DISK DEVICE AND METHOD OF MANUFACTURING DISK DEVICE

CROSS-REFERENCE TO RELATED APPLICATIONS

This application is based upon and claims the benefit of priority from Japanese Patent Application No. 2018-011981, filed on Jan. 26, 2018 and Japanese Patent Application No. 2018-147140, filed on Aug. 3, 2018; the entire contents of all of which are incorporated herein by reference.

FIELD

Embodiments described herein relate generally to a disk device and a method of manufacturing the disk device.

BACKGROUND

In a disk device that includes a disk medium having a plurality of tracks, on each of which servo areas and data areas are placed, data is written onto and/or read from the data areas while the head is positioned using information in the servo areas. In this case, it is desired that the data capacity of the disk medium be improved.

BRIEF DESCRIPTION OF THE DRAWINGS

FIG. 1 is a diagram illustrating the configuration of a disk device according to a first embodiment;
FIGS. 3A to 3D are diagrams illustrating the configuration of a head in the first embodiment;
FIG. 12 is a graph illustrating results of measuring the offset amount in the first embodiment;
FIGS. 17A and 17B are diagrams illustrating offset amounts deriving process in the first and second embodiments;
FIGS. 20A to 20D are diagrams illustrating the configuration of the head in a third embodiment.

DETAILED DESCRIPTION

Figure 2A:
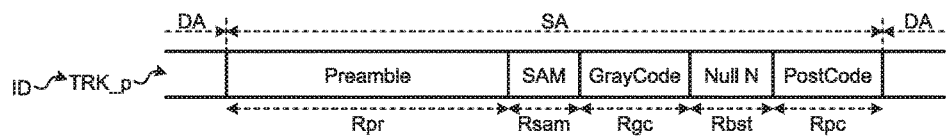
FIGS. 2A to 2E are diagrams illustrating the configuration of a disk medium in the first embodiment.

In general, according to one embodiment, there is provided a disk device including a head and a disk medium. The head includes a first read element and a second read element. The disk medium is partitioned into a plurality of zones. The plurality of zones include a first zone and a second zone. The first zone includes a plurality of tracks on each of which a servo area and a data area are placed, a servo burst region in the servo area from which to detect the amount of off-track of the head from the center of a track, having a first bit length. The second zone includes a plurality of tracks on each of which a servo area and a data area are placed, a servo burst region in the servo area from which to detect the amount of off-track of the head from the center of a track, having a second bit length shorter than the first bit length.

Exemplary embodiments of a disk device will be explained below in detail with reference to the accompanying drawings. The present invention is not limited to the following embodiments.

First Embodiment

A disk device 100 according to an embodiment will be described using FIG. 1. FIG. 1 is a diagram illustrating the configuration of the disk device 100.

The disk device 100 is, for example, a device which records information onto a disk medium 111 via a head 122 and reads a signal from the disk medium 111 via the head 122 (such as a disk device or a hard disk device). Specifically, the disk device 100 comprises the disk medium 111, a spindle motor (SPM) 112, a motor driver 121, the head 122, an actuator arm 115, a voice coil motor (VCM) 116, a head amplifier 124, a read write channel (RWC) 125, a hard disk controller (HDC) 131, a buffer memory 129, and a control unit 126.

The disk medium 111 is, for example, a magnetic recording medium having outer radius 495 mm and is rotated about a rotation axis as the center at a predetermined rotation speed by the SPM 112. The SPM 112 is rotationally driven by the motor driver 121. Although the disk device 100 can include a plurality of disk media 111, for simplicity of description and illustration, description will be made focusing on one disk medium 111.

As one example of the disk medium 111, a magnetic recording medium in normal hard disk drive (HDD) complying with the 3.5 inch form factor, which is equipped with one or a plurality of recording media using a substrate with average outer radius 495 mm where a position with a distance of smaller that 45.0-46.5 mm from rotation center is outer most radial position for a plurality of data tracks. This is intended to employ a region with a distance of about 1.0-2.5 mm from outer edge of the magnetic recording medium as margin region for loading/unloading of the magnetic head. For example, in a case of using a substrate with average outer radius 496 mm, a position with a distance of smaller that 45.0-47.0 mm from rotation center is outer most radial position for a plurality of data tracks. Or, in a case of using a substrate with average outer radius 497 mm, a position with a distance of smaller that 46.0-47.5 mm from rotation center is outer most radial position for a plurality of data tracks.

The head 122 is at the tip of the actuator arm 115 and seeked toward a target track by the VCM 116 driven by the motor driver 121 along a radial direction (track width direction) of the disk medium 111, and performs a tracking operation on the target track. When the rotation of the disk medium 111 is stopped or so on, the head 122 is evacuated on a ramp (not shown). The head 122 is a two dimensional magnetic recording (TDMR) head and includes a write element W and a plurality of read elements R1, R2. Although the disk device 100 can include a plurality of heads 122 corresponding to the recording surfaces (front and back) of a plurality of disk media 111, for simplicity of description and illustration, description will be made hereinafter focusing on one disk medium 111 and one head 122 corresponding to it.

The head amplifier 124 amplifies a signal read by the head 122 from the disk medium 111 to output and supplies to the RWC 125. Further, the head amplifier 124 amplifies a signal supplied from the RWC 125 and with which to write data onto the disk medium 111 and supplies to the head 122.

The HDC 131 controls data transmission to and reception from a host computer 140 via an I/F bus, controls the buffer memory 129, performs data-error correction processing on write data, and so on. The buffer memory 129 is used as a cache for data transmitted to and received from the host computer 140. Further, the buffer memory 129 is used for the purpose of temporarily storing data read from the disk medium 111, data to be written onto the disk medium 111, or for-control firmware read from the disk medium 111, and so on.

The RWC 125 code modulates data supplied from the HDC 131 to be written onto the disk medium 111 and supplies to the head amplifier 124. Further, the RWC 125 code demodulates the signal read from the disk medium 111 and supplied via the head amplifier 124 and outputs as digital data to the HDC 131.

A for-operation memory 127 (e.g., an SRAM), a nonvolatile memory 128 (e.g., a flash memory), and a for-temporary-storage buffer memory 129 (e.g., a DRAM) are connected to the control unit 126. The control unit 126 is, for example, a CPU or MPU and controls the disk device 100 overall according to firmware stored beforehand in the nonvolatile memory 128 or on the disk medium 111. The firmware includes initial firmware and for-control firmware used for normal operation. The initial firmware executed first at the time of startup is stored in, e.g., the nonvolatile memory 128, and the for-control firmware used in normal operation is recorded on the disk medium 111. By control according to the initial firmware, the for-control firmware is read from the disk medium 111 temporarily into the buffer memory 129 and then stored into the for-operation memory 127.

Note that the configuration including the RWC 125, the control unit 126, and the HDC 131 can be regarded as a controller 130. The controller 130 can be implemented, e.g., as a system-on-chip (SoC).

In the disk device 100, a plurality of tracks (i.e., a plurality of servo tracks) are defined concentrically on the disk medium 111 by servo patterns recorded on the disk medium 111. The controller 130 can manage track numbers, assigned to the tracks in the order from inner to outer or from outer to inner, as information indicating radial positions on the disk medium 111. For example, as one example of the plurality of tracks, a region with a distance of about 1.0-2.5 mm from outer edge of the magnetic recording medium is employed as margin region for loading/unloading of the magnetic head, so that outermost data track can be designed at 46.5-45 mm radial position from rotation center and innermost data track can be designed at about 20-21 mm radial position. It should be noted that, as the disk medium 111, outermost data track in a case of using the magnetic disk medium with outer radius (96 mm can be designed at 47-45.5 mm radial position. Further, the controller 130 can manage a plurality of zones, concentrically partitioned into each to include a plurality of tracks, as information indicating radial positions on the disk medium 111. For example, the controller 130 can manage zone partition information in which track numbers are associated with zone numbers (information to identify an inner circumference zone ID, a middle circumference zone MD, and an outer circumference zone OD) for the plurality of tracks. Although hereinafter the case where the zones managed by the controller 130 are three zones (the inner circumference zone ID, middle circumference zone MD, and outer circumference zone OD) will be described illustratively, not being limited to this, arbitrary zone partitioning can be performed.

It should be noted that hereinafter a velocity of the head 122 is referred to as radial component of velocity vector when the head 122 moves in relative to servo tracks.

Figure 2B:
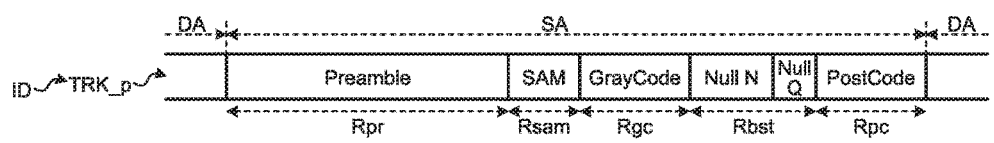
Figure 2C:
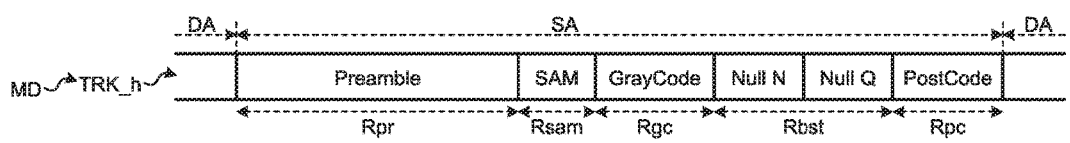

In the production process of the disk medium 111, on each track, as shown in FIG. 2C, a data area DA and a servo area SA can be provided alternately, repeatedly along a circumferential direction. FIGS. 2A to 2E are diagrams illustrating the configuration of the servo area SA. The data area DA is an area on which to record data. The servo area SA is an area on which to record a servo pattern. The controller 130 positions the head 122 using information of servo patterns read from the servo areas SA and can write and/or read data onto and/or from the data areas DA.

The servo pattern includes multiple types of patterns such as a preamble, a servo mark, a gray code, a burst pattern, and a post-code. Correspondingly, the servo area SA includes a preamble region Rpr, a servo mark region Rsam, a gray code region Rgc, a servo burst region Rbst, and a post-code region Rpc. The preamble region Rpr is a region on which the preamble is recorded. The preamble is a pattern that is a reference for amplitude and phase synchronization with the servo pattern. The servo mark region Rsam is a region on which the servo mark is recorded. The servo mark is a pattern indicating a reference position on the track along the circumferential direction. The gray code region Rgc is a region on which the gray code is recorded. The gray code includes information (such as a track number) indicating the radial position of the track in the disk medium 111. The servo burst region Rbst is a region on which the burst pattern is recorded. The burst pattern is a pattern for detecting the amount of off-track from the track center of the head 122. The post-code region Rpc is a region on which the post-code is recorded. The post-code includes information about a correction amount (such as an eccentricity correction amount) for correcting the error of the amount of off-track obtained with the burst pattern.

A null-type burst pattern can be adopted as the burst pattern to be recorded onto the servo burst region Rbst. The null-type burst pattern includes two phases, an N phase (Null N) and a Q phase (Null Q), so that the bit length of the servo burst region Rbst can be shortened to about half of that in the case where four phases, an A phase, B phase, C phase, and D phase are included.

In the N phase, in order to realize the pattern corresponding to the A phase minus the B phase, a magnetization pattern in which the phase is inverted alternately in polarity at intervals of 180° (=1 cyl) along a radial direction in the N phase can be arranged. In the Q phase, in order to realize the pattern corresponding to the C phase minus the D phase, a magnetization pattern in which the phase is inverted alternately in polarity at intervals of 180° (=1 cyl) along the radial direction in the Q phase can be arranged. The magnetization patterns of the N phase and the Q phase can be arranged to be shifted by 90° (=0.5 cyl) in phase from each other along the radial direction. Thus, also in the case where the null-type burst pattern is adopted, as shown in FIG. 2C, the servo burst region Rbst accounts for a substantial bit length in the servo area SA.

Meanwhile, the head 122 is a two dimensional magnetic recording (TDMR) head and includes the write element W and the plurality of read elements R1, R2 as shown in FIGS. 3A to 3D. FIGS. 3A to 3D are diagrams illustrating the configuration of the head 122. In the plan view shown in FIG. 3A, when the disk medium 111 rotates clockwise, the write element W is placed on the upstream side along the rotational direction in the head 122; the read element R1 is placed on the downstream side along the rotational direction in the head 122; and the read element R2 is placed between the write element W and the read element R1. The controller 130 can write data onto the disk medium 111 by the write element W and read data from the disk medium 111 by the plurality of read elements R1, R2.

Of the two read elements R1, R2, the read element R1 can be used as a read element on the master side, and the read element R2 can be as a read element on the slave side. In servo processing, the controller 130 may demodulate a read signal $\phi R1$ from the read element R1 on the master side into servo pattern information so as to position the head 122. But with this head 122, the controller 130 can acquire servo pattern information by each read element R1, R2. A new servo method utilizing the read signals $\phi R1$, $\phi R2$ of the two read elements R1, R2 is desired.

The amount Tr of an offset along a radial direction between the two read elements R1, R2 needs to be considered so as to utilize the read signals $\phi R1$, $\phi R2$ of the two read elements R1, R2. Because the arm angle of the actuator arm 115 changes according to which radial position shown in FIG. 3A in the disk medium 111 (which zone of the inner circumference zone ID, middle circumference zone MD, and outer circumference zone OD) the head 122 is located in, the skew angle β of the head 122 changes. Correspondingly, the relative positional relation between the read elements R1 and R2 with respect to the disk medium 111 also changes, so that the amount Tr of the offset along the radial direction between the read elements also changes.

If the head 122 is, during a tracking operation, located over a track TRK_r in the outer circumference zone OD, the positional relation between the write element W and the read elements R1, R2, when the head 122 is viewed from the disk medium 111 side, comes to be shown in FIG. 3B. That is, the skew angle β becomes negative (β<0), inclining toward the outer circumference side, so that the amount Tr of the offset of the read element R2 from the read element R1 becomes negative (<0).

If the head 122 is, during a tracking operation, located over a track TRK_h in the middle circumference zone MD, the positional relation between the write element W and the read elements R1, R2, when the head 122 is viewed from the disk medium 111 side, comes to be shown in FIG. 3C. That is, the skew angle β becomes almost zero (β≈0), so that the amount Tr of the offset of the read element R2 from the read element R1 becomes almost zero (≈0).

If the head 122 is, during a tracking operation, located over a track TRK_p in the inner circumference zone ID, the positional relation between the write element W and the read elements R1, R2, when the head 122 is viewed from the disk medium 111 side, comes to be shown in FIG. 3D. That is, the skew angle β becomes positive (β>0), inclining toward the inner circumference side, so that the amount Tr of the offset of the read element R2 from the read element R1 becomes positive (>0).

Figure 4A:
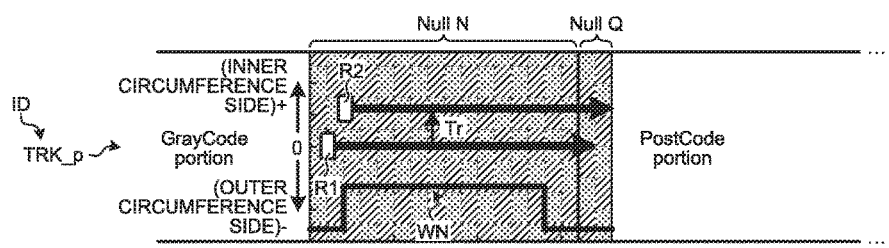
FIGS. 4A to 4C are diagrams illustrating the operation of the head in the first embodiment.
Figure 4B:
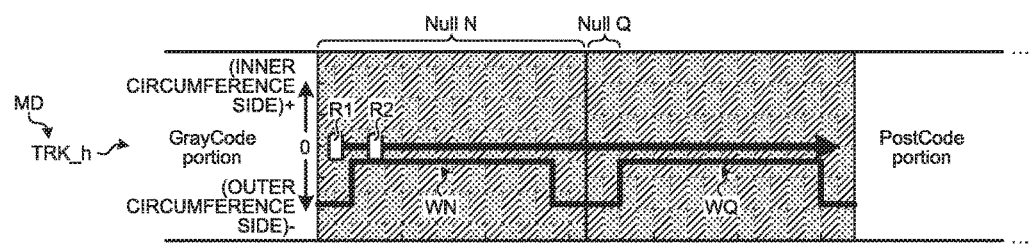
Figure 4C:
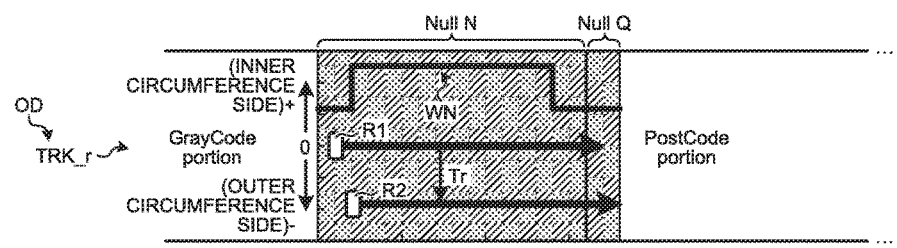

Focusing attention on the operation when the head 122 passes, during a tracking operation, across the N phase region (Null N region) in the servo burst region Rbst, the operation comes to be shown in FIGS. 4A to 4C and 5A to 5F. FIGS. 4A to 4C are diagrams illustrating the operation of the head 122. FIGS. 5A to 5F are diagrams illustrating results of detecting burst patterns.

Figure 5A:
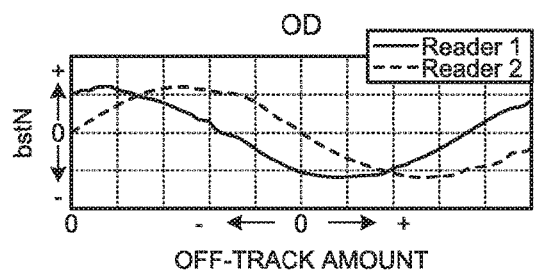
FIGS. 5A to 5F are diagrams illustrating results of detecting burst patterns in the first embodiment.

If the head 122 is, during a tracking operation, located over the track TRK_r in the outer circumference zone OD, as shown in FIG. 4C, the offset amount Tr has a negative value, so that an N-phase demodulation window WN of a gate signal becomes active with the radial position of the read element R2 being offset from that of the read element R1 by |Tr| toward the outer circumference side. In this state, the result BstN of detecting the N-phase burst pattern when changing the amount of off-track from the track center over the range from the minus side (outer circumference side) to the plus side (inner circumference side), can change indicating waveforms where the read signal $\phi R2$ of the read element R2 is earlier in phase than the read signal $\phi R1$ of the read element R1 as shown in FIG. 5A.

Figure 5B:
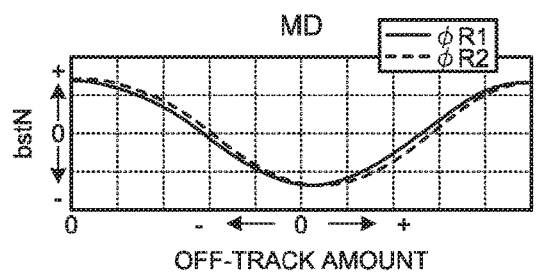
Figure 5C:
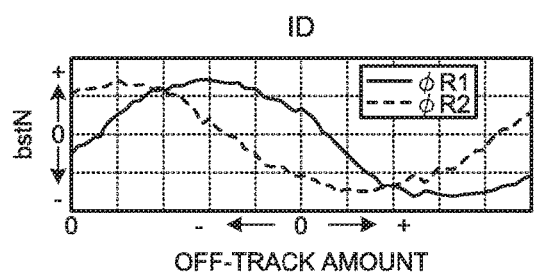
Figure 5D:
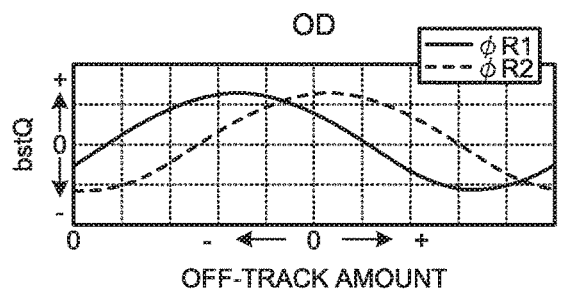
Figure 5E:
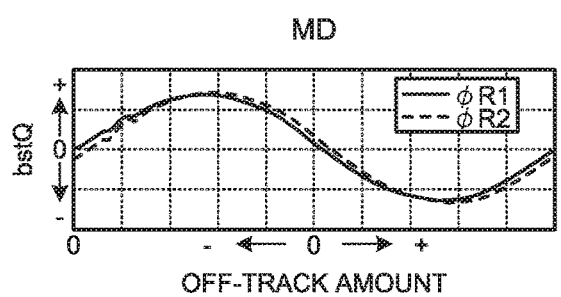
Figure 5F:
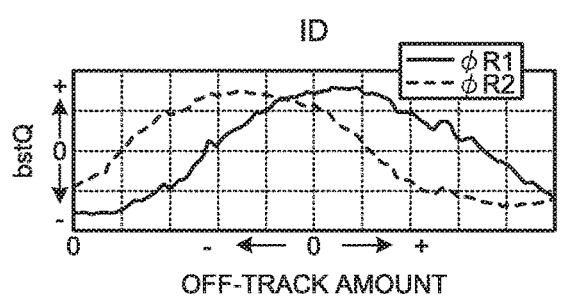

If the head 122 is, during a tracking operation, located over the track TRK_h in the middle circumference zone MD, as shown in FIG. 4B, the offset amount Tr is almost zero, so that the N-phase demodulation window WN of the gate signal becomes active with the radial position of the read element R2 almost coinciding with that of the read element R1. In this state, the result BstN of detecting the N-phase burst pattern when changing the amount of off-track from the track center over the range from the minus side (outer circumference side) to the plus side (the inner circumference side), changes indicating that the read signals $\phi R1$, $\phi R2$ of the two read elements R1, R2 almost coincide as shown in FIG. 5B. Likewise, the Q-phase demodulation window WQ of the gate signal becomes active with the radial position of the read element R2 almost coinciding with that of the read element R1. In this state, the result BstQ of detecting the Q-phase burst pattern when changing the amount of off-track from the track center over the range from the minus side (outer circumference side) to the plus side (inner circumference side), changes indicating that the read signals $\phi R1$, $\phi R2$ of the two read elements R1, R2 almost coincide as shown in FIG. 5E. The waveforms shown in FIG. 5E of the result BstQ of detecting the Q-phase burst pattern can be earlier in phase than the waveforms shown in FIG. 5B of the result BstN of detecting the N-phase burst pattern.

If the head 122 is, during a tracking operation, located over the track TRK_p in the inner circumference zone ID, as shown in FIG. 4A, the offset amount Tr has a positive value, so that the N-phase demodulation window WN of the gate signal becomes active with the radial position of the read element R2 being offset from that of the read element R1 by

|Tr| toward the inner circumference side. In this state, the result BstN of detecting the N-phase burst pattern when changing the amount of off-track from the track center over the range from the minus side (outer circumference side) to the plus side (inner circumference side), can change indicating waveforms where the read signal φR2 of the read element R2 is later in phase than the read signal φR1 of the read element R1 as shown in FIG. 5C.

That is, for the middle circumference zone MD where the offset amount Tr is almost zero, in order to detect the amount of off-track of the head 122, both the N phase and Q phase of the servo burst region Rbst need to be detected. In contrast, for the inner circumference zone ID and the outer circumference zone OD, it is expected that, with using the offset amount Tr, detecting the N phase can suffice to detect the amount of off-track of the head 122.

Accordingly, in the first embodiment, in the disk device 100, by making the servo burst regions Rbst of the tracks in the inner circumference zone ID and the outer circumference zone OD be formed substantially of only the N-phase burst pattern, the data capacity of the disk medium 111 is improved. Specifically, in the production process, after processing using the N-phase burst pattern and the Q-phase burst pattern is performed, at least part (i.e., most part or all) of the Q-phase burst pattern is erased. Thus, by forming the disk medium 111 such that the bit length of the servo burst regions Rbst of the tracks in the inner circumference zone ID and the outer circumference zone OD is shorter than that of the servo burst regions Rbst of the tracks in the middle circumference zone MD, the data capacity of the disk medium 111 is improved.

For example, as shown in FIG. 2C, the servo burst regions Rbst of each track (e.g., the track TRK_h) in the middle circumference zone MD each include the N-phase burst pattern (Null N) and the Q-phase burst pattern (Null Q).

In contrast, as shown in FIG. 2A, the servo burst regions Rbst of each track (e.g., the track TRK_r) in the outer circumference zone OD each include the N-phase burst pattern (Null N) and do not include the Q-phase burst pattern (Null Q).

Or, as shown in FIG. 2B, the servo burst regions Rbst of each track (e.g., the track TRK_r) in the outer circumference zone OD each include the N-phase burst pattern (Null N) and include a Q-phase burst pattern (Null Q) shorter in bit length than the Q-phase burst pattern in each track in the middle circumference zone MD. That is, the servo burst regions Rbst of each track in the outer circumference zone OD each include a Q-phase burst pattern (Null Q) having a bit length considerably shorter than the bit length corresponding to the pulse width (see FIG. 4B) of the Q-phase demodulation window WQ of the gate signal.

Figure 2D:
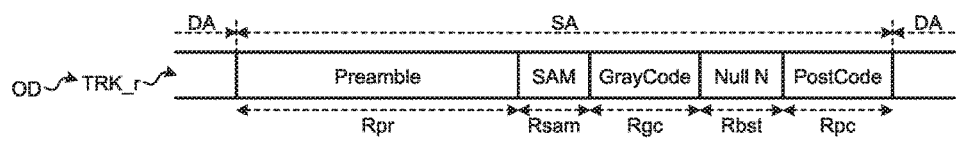

As shown in FIG. 2D, the servo burst regions Rbst of each track (e.g., the track TRK_p) in the inner circumference zone ID each include the N-phase burst pattern (Null N) and do not include the Q-phase burst pattern (Null Q).

Figure 2E:
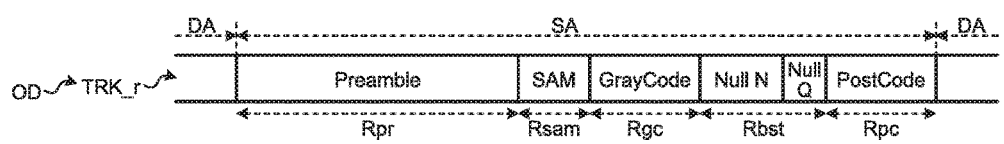

Or, as shown in FIG. 2E, the servo burst regions Rbst of each track (e.g., the track TRK_p) in the inner circumference zone ID each include the N-phase burst pattern (Null N) and include a Q-phase burst pattern (Null Q) shorter in bit length than the Q-phase burst pattern in each track in the middle circumference zone MD. That is, the servo burst regions Rbst of each track in the inner circumference zone ID each include a Q-phase burst pattern (Null Q) having a bit length considerably shorter than the bit length corresponding to the pulse width (see FIG. 4B) of the Q-phase demodulation window WQ of the gate signal.

Figure 6:
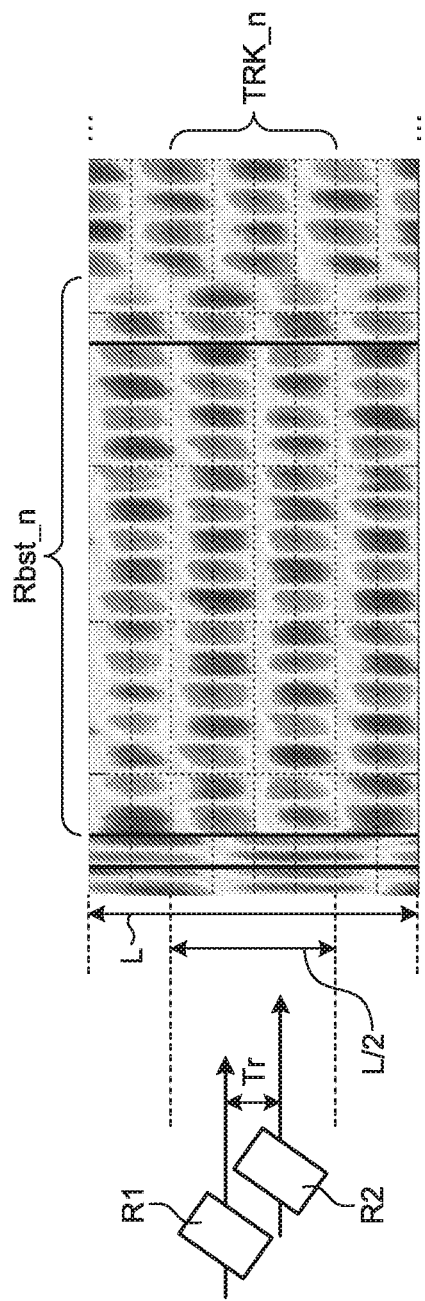
FIG. 6 is a diagram illustrating the repetition length along a radial direction of a burst pattern in the first embodiment.

In this case, the lag or lead phase difference θr of the read signal φR2 from the read signal φR1 shown in FIGS. 5A to 5C can be obtained from the amount Tr of the offset along the radial direction between the read elements and the repetition length L along the radial direction of the burst pattern shown in FIG. 6 with use of the following expression 1. FIG. 6 is a diagram illustrating the relation between the amount Tr of the offset between the read elements and the repetition length L along the radial direction of the burst pattern. The repetition length L of the burst pattern is equal to twice the track pitch (i.e., L=2*Tw) and equal to twice the track width of, e.g., the track TRK_n.

$$\theta r = 2\pi \frac{Tr}{L} \qquad \text{Expression 1}$$

Here, let N1 be the result BstN of detecting the N phase by the read element R1, Q1 be the result BstQ of detecting the Q phase by the read element R1, N2 be the result BstN of detecting the N phase by the read element R2, and Q2 be the result BstQ of detecting the Q phase by the read element R2. As shown in FIGS. 5B and 5E, N1 is a waveform, e.g., 90° earlier in phase than Q1. N2 is a waveform, e.g., 90° earlier in phase than Q2.

As shown in Expression 1, if Tr=L/4 (>0), then θr=π/2=90° (a lead phase), so that N2 can be regarded as being Q1 (N2=Q1). That is, for the inner circumference zone ID and the outer circumference zone OD where the absolute value of the offset amount Tr can be secured, if off-track demodulation is performed considering that BstN=N1 and that BstQ=N2, the read signals can be demodulated into the off-track position of the head 122 without using the Q-phase burst pattern at all.

Figure 7:
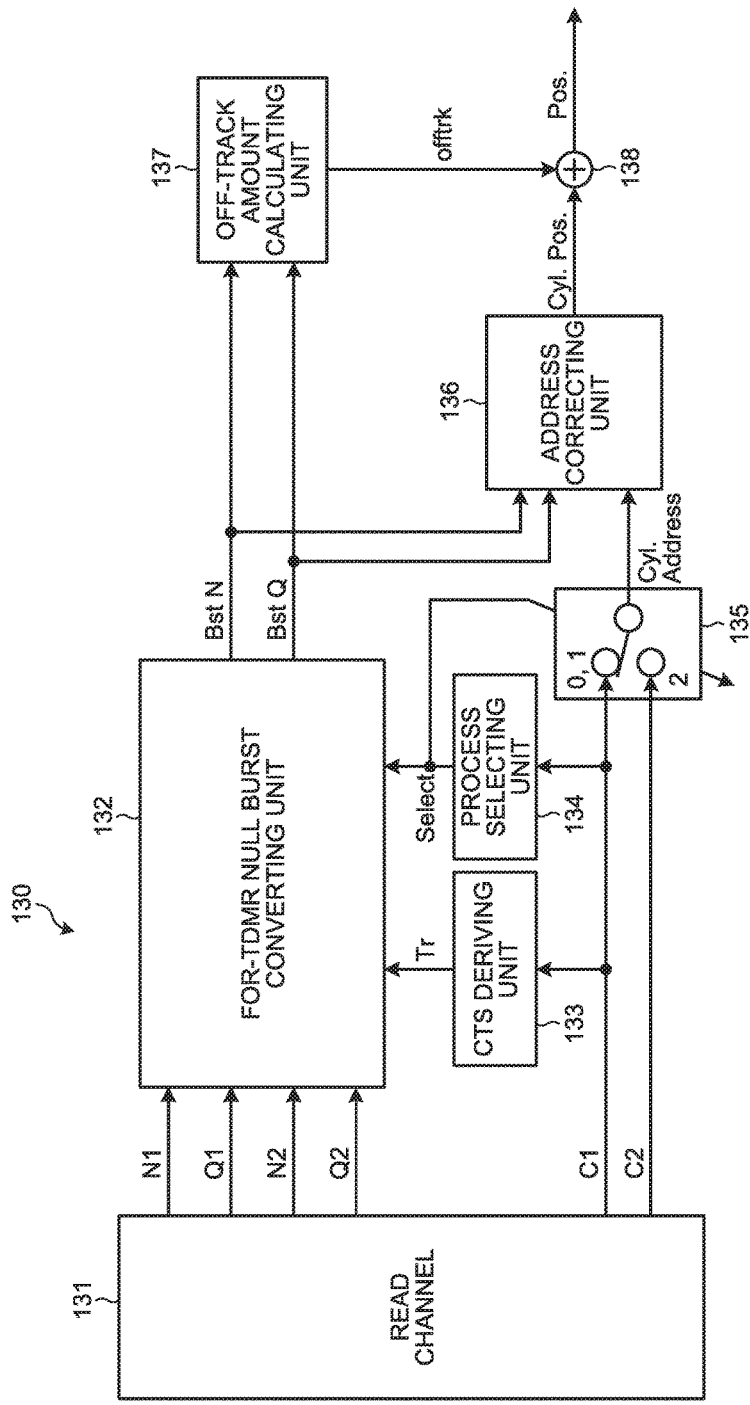
FIG. 7 is a diagram illustrating the configuration of a controller in the first embodiment.

More specifically, the controller 130 can be configured as shown in FIG. 7. FIG. 7 is a diagram illustrating the configuration of the controller 130. The controller 130 shown in FIG. 7 is functionally configured and may be implemented in hardware in, e.g., the HDC 131 or the like (see FIG. 1) (e.g., as a system-on-chip). Or the controller 130 shown in FIG. 7 may be implemented in software in, e.g., the control unit 126 or the like (e.g., as function modules spread out by, e.g., the control unit 126 or the like in a batch or sequentially according to the process proceeding in the for-operation memory 127 or the like). Or the controller 130 shown in FIG. 7 may be partially implemented in hardware in, e.g., the HDC 131 or the like with the remaining functions being implemented in software in the control unit 126 or the like.

The controller 130 includes a read channel 131, a NULL burst converting unit 132, an CTS deriving unit 133, a process selecting unit 134, a selector 135, an address correcting unit 136, an off-track amount calculating unit 137, and an adder 138.

The controller 130 can detect the off-track amount of the head 122 from the read signal of the burst pattern. That is, the read elements R1, R2 are connected to the head amplifier 124 (see FIG. 1) that can reproduce two channels for the TDMR independently. The output of the head amplifier 124 is inputted to the read channel 131 for the TDMR. The read channel 131 for the TDMR includes two servo demodulating circuits and can process the read signals φR1, φR2 of the two read elements R1, R2 independently. The read signals N1, N2, Q1, Q2 of the null-type burst pattern are acquired for their fundamental frequency components during periods when the demodulation window WN or WQ of the gate signal is active (see FIGS. 4A to 4C) and are integrated with sine/cosine wave coefficients to be stored as burst values BstN, BstQ into a register.

For example, in the position detecting process, the address correcting unit 136 reads two burst values BstN, BstQ corresponding to Null N, Q and a cylinder address (track number) demodulated from the read gray code. The address correcting unit 136±1 corrects the cylinder address through burst-value quadrant decision as needed and supplies to the adder 138. The off-track amount calculating unit 137 derives the off-track amount offtrk from the two burst values BstN, BstQ and supplies to the adder 138. The adder 138 adds the off-track amount offtrk to the corrected cylinder address to generate a current head position Pos indicating the current position of the head 122.

The off-track amount calculating unit 137 calculates the off-track amount offtrk using publicly known speed correction, rotation correction, quadrant classification, γ correction, and the like but theoretically obtains the phase angle corresponding to θ, considering that BstN is cos θ information and that BstQ is sin θ information and calculates the offtrk from the following expression 2 using the repetition length L along the radial direction of the burst pattern.

$$\mathit{offtrk} = \frac{\theta}{2\pi}L = \frac{\tan^{-1}(\sin\theta/\cos\theta)}{2\pi}L = \frac{\tan^{-1}(BstQ/BstN)}{2\pi}L \quad \text{Expression 2}$$

Figure 8:
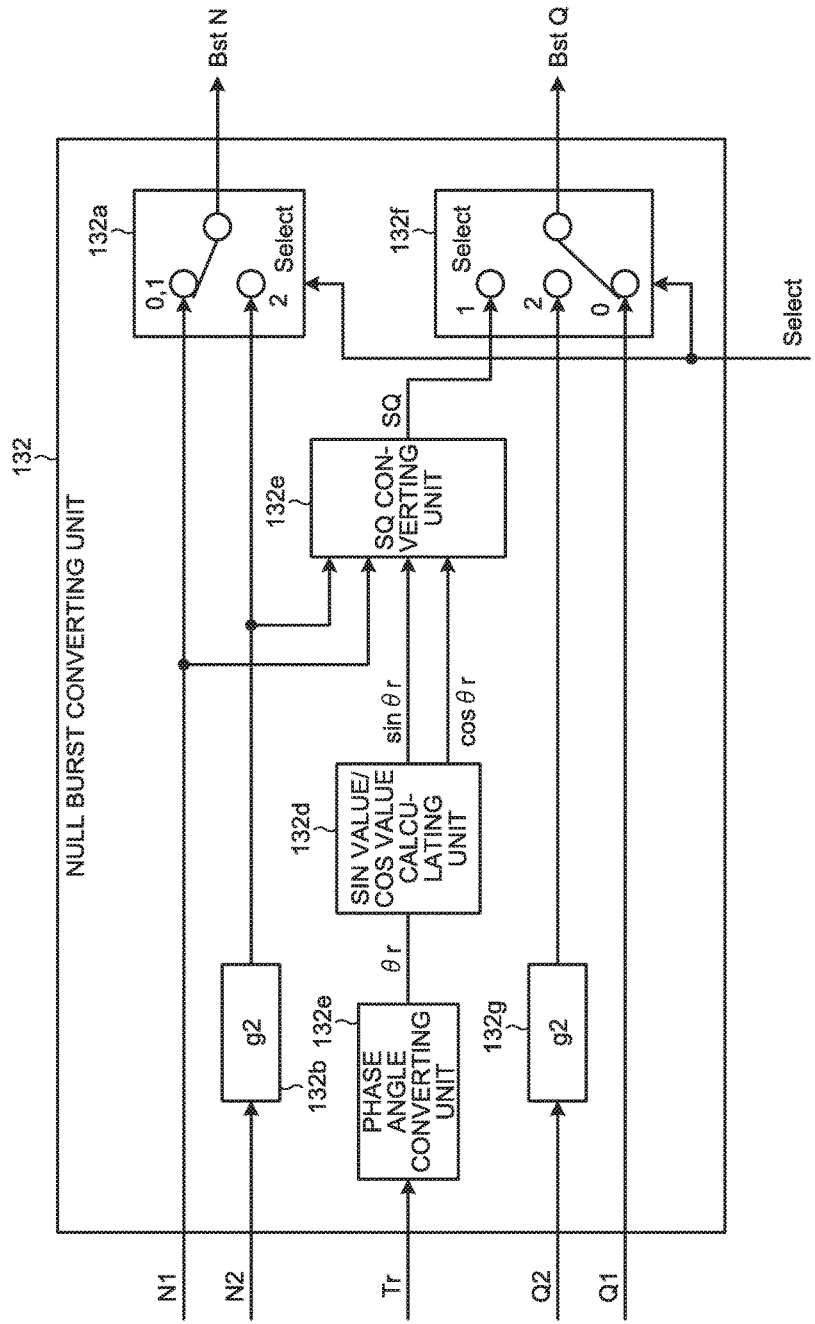
FIG. 8 is a diagram illustrating the configuration of a NULL burst converting unit in the first embodiment.

The controller 130 can obtain servo information corresponding to the respective read signals φR1, φR2 of the two read elements R1, R2. The respective information corresponding to BstN, BstQ, and Cyl. Address each contain two pieces of information for R1 and for R2. Accordingly, in order to link the read signals φR1, φR2 of the two read elements R1, R2 (i.e., N1, N2, Q1, Q2 acquired during periods when the demodulation window WN or WQ is active), the NULL burst converting unit 132 for the TDMR is provided at the stage in front of the off-track amount calculating unit 137. For example, the NULL burst converting unit 132 is configured as shown in FIG. 8. FIG. 8 is a diagram illustrating the configuration of the NULL burst converting unit 132. The NULL burst converting unit 132 includes a selector 132a, a coefficient multiplying unit 132b, a phase angle converting unit 132c, a sin value/cos value calculating unit 132d, an SQ converting unit 132e, a selector 132f, and a coefficient multiplying unit 132g.

The selector 135 shown in FIG. 7 can switch the result to be used as Cyl. Address (a track number) between the result C1 of demodulating the gray code read by the read element R1 on the master side and the result C2 of demodulating the gray code read by the read element R2 on the slave side.

For example, when positioning the head 122 over a track in the middle circumference zone MD, the gate signal to the read channel 131 is held active independently during the for-Null-N demodulation window WN and the for-Null-Q demodulation window WQ (see FIG. 4B), and burst output is obtained from the read element R1 side and the read element R2 side for a total of four pieces of information. It is defined that N1=the result BstN of detecting the N phase by the read element R1, that Q1=the result BstN of detecting the Q phase by the read element R1, that N2=the result BstN of detecting the N phase by the read element R2, and that Q2=the result BstN of detecting the Q phase by the read element R2.

The read signal φR1 of the read element R1 on the master side is used in the demodulation of the servo signal of the middle circumference zone MD (the position detecting process of the head 122). If the address (a track number) indicated by the result C1 of demodulating the gray code read by the read element R1 is in the address range of the middle circumference zone MD, then the process selecting unit 134 outputs a zero as a process selecting signal Select (the demodulation mode=0).

In response to the process selecting signal Select=0, each of the selectors 132a, 132f shown in FIG. 8 switches to the "0" side. The NULL burst converting unit 132 shown in FIG. 7 outputs N1 as BstN and Q1 as BstQ to the off-track amount calculating unit 137 and the like. The off-track amount calculating unit 137 performs calculation denoted by the above expression 2 to calculate the off-track amount of the head 122 (or the read element R1). The adder 138 adds the off-track amount offtrk to the corrected cylinder address agreeing with the read signal φR1 to generate a current head position Pos (or Pos1) indicating the current position of the head 122 (or the read element R1).

The position detection process uses the read signals φR1, φR2 of two read elements R1, R2 and the offset amount Tr indicating how far apart the read element R2 runs in relative to the read element R1. Since this offset amount Tr is CTS (Cross Track Separation between two read elements) itself, outputs of the CTS deriving unit 133 are supplied to the NULL burst converting unit 132. The CTS deriving unit 133 derives CTS at its radial position by using approximate expression in accordance with an address (e.g., track number) indicated by demodulation results C1 of gray codes.

For N1, Q1 corresponding to BstN and BstQ of the read element R1 on the master side, a relation given by the following expression 3 holds.

$$N1=\cos\theta, Q1=\sin\theta \quad \text{Expression 3}$$

In contrast, turning attention to the relation between N1 and N2, in the middle circumference zone MD, because the burst signal amplitudes are obtained by the read elements R1, R2 in almost the same radial position, the waveforms almost coincide (see FIG. 5B), but it is confirmed that in the outer circumference zone OD, N1 is earlier in phase than N2 and that conversely in the inner circumference zone ID, N1 is later in phase than N2 (see FIG. 5A). Letting θr be this phase difference, they are expressed by the following expression 4, where N2 leads when positive and lags when negative.

$$N1=\cos\theta, N2=\cos(\theta+\theta r) \quad \text{Expression 4}$$

This is because the burst-pattern demodulation radial position differs depending on the distance along the radial direction between the read elements (the amount offset Tr), and the phase difference θr is determined by the expression 1 using the repetition length L along the radial direction of the burst pattern. Part or all of the Q-phase burst pattern is erased by a post-code post-recording process in the production process, but if a signal corresponding to this Q1 can be generated, the off-track amount calculating unit 137 can calculate the off-track amount. Letting SQ be a signal corresponding to Q1, the following expression 5 is derived with N1, N2, cos θr, and sin θr by expanding the expression 4.

$$SQ=\sin\theta=(N1\cdot\cos\theta r - N2)/\sin\theta r \quad \text{Expression 5}$$

The SQ converting unit 132e shown in FIG. 8 performs conversion corresponding to the expression 5. Where a forced R1 reproduction flag or forced R2 reproduction flag is not set, when the address (a track number) indicated by the result C1 of demodulating the gray code read by the read element R1 is not in the address range of the middle circumference zone MD (when in the address range of the outer circumference zone OD or inner circumference zone ID), then the process selecting signal Select=1 (the demodulation mode=1) is outputted. Thus, the selector 135 shown in FIG. 7 switches to the "1" side, and the selectors 132a, 132f shown in FIG. 8 switch to the "1" side. The controller 130 uses the WN for the N phase as the demodulation window of the gate signal, and not the WQ for the Q phase. The demodulation mode=1 differs from the demodulation mode=0 in that SQ (=BstQ) obtained by the SQ converting unit 132e converting is adopted, with no change to BstN=N1. The demodulation mode=1 is the same as the demodulation mode=0 in that the off-track amount calculating unit 137 calculates the off-track amount of the head 122 and that the adder 138 adds the off-track amount offtrk to the corrected cylinder address agreeing with the read signal φR1 to generate a current head position Pos indicating the current position of the head 122.

Note that the controller 130 can switch the demodulation mode according to the value of the process selecting signal Select. The controller 130 sets the Select to equal 0 thereby switching to the demodulation mode=0. For example, when it is determined that the head 122 is located over the middle circumference zone MD or when a forced R1 demodulation mode is activated (forced R1 demodulation setting has been done), the process selecting signal Select becomes 0. Accordingly, the controller 130 takes N1, Q1 as BstN, BstQ respectively. The controller 130 sets the Select to equal 1 thereby switching to the demodulation mode=1. This demodulation mode is a mode in which the position of the head 122 is detected using N1, N2 and is selected when it is determined that the head 122 is located over the outer circumference zone OD or the inner circumference zone ID. In this demodulation mode, N1 is taken as BstN, and a combined value of N1 and N2 obtained using Tr information is taken as BstQ.

The controller 130 sets the process selecting signal Select to equal 2 thereby switching to the demodulation mode=2. This demodulation mode is a mode used in offset amount measurement in the production process and is not used in controlling the position of the head 122 after shipment. For example, in calculating the offset amount Tr, this mode is selected to detect the position of the read element R2 (if forced R2 demodulation setting has been done). In this demodulation mode, the selector 135 shown in FIG. 7 switches to the "2" side, and the selectors 132a, 132f shown in FIG. 8 switch to the "2" side. The address correcting unit 136 shown in FIG. 7 corrects the address (a track number) indicated by the result C2 of demodulating the gray code read by the read element R2 and supplies to the adder 138. The NULL burst converting unit 132 outputs N2 as BstN and Q2 as BstQ to the off-track amount calculating unit 137 and the like. The off-track amount calculating unit 137 performs calculation denoted by the above expression 2 to calculate the off-track amount of the read element R2. The adder 138 adds the off-track amount offtrk to the corrected cylinder address agreeing with the read signal φR2 to generate a current head position Pos2 indicating the current position of the read element R2.

For example, when a forced R2 position calculation flag has been set, the controller 130 sets the process selecting signal Select to equal 2. Also for the Cyl. Address, the R2 side is selected, and g2×N2 is output as BstN, and g2×Q2 is output as BstQ. These have been multiplied by g2, which means that position detection has been performed by the read element R2 on the slave side.

The gain g2 is an adjusted gain which is set through calibration in an adjusting process before shipment, and although in most cases the gain g2=1, the reason why this gain is provided is as follows. While the read signal outputted by the head amplifier 124 changes in amplitude depending on GMR sensitivity and the like of the read elements R1, R2, automatic gain adjustment called AGC, which makes the signal amplitude level constant at the time of AD taking-in, is performed in the channel front-stage unit. Even if the signal amplitude at channel input differs, this adjustment makes the signal amplitude after the ADC taking-in the same, with the amplitude of the burst value also being kept constant. In most cases, the gain g2 can equal 1. However, in reality, sometimes the amplitudes of burst output profiles of the R1 side and R2 side at the time of off-track advance do not coincide. For a measure against this, in order to make the signal amplitude of the burst output profile the same between N1 and N2, the gain g2 is needed. If there should be a head with which the signal amplitudes do not coincide, by correcting with the gain g2 of the head, corrected amplitudes can be made to coincide, so that the occurrence of distortion in SQ conversion can be prevented.

In calculating the offset amount Tr, a forced R1 position calculation flag is set, and the controller 130 performs the detection of the read element R1 position according to the forced R1 position calculation flag to acquire the current head position Pos1 of the read element R1. Then the forced R2 position calculation flag is set, and the controller 130 performs the detection of the read element R2 position according to the forced R2 position calculation flag to acquire the current head position Pos2 of the read element R2.

That is, the head positioning is performed with the R1 side, and thus first the Pos is obtained and taken as Pos1 with the forced R2 position calculation flag being cleared. In a post-process after the servo process is performed, the forced R2 position calculation flag is set, and second position detection is performed with the R2 side, and taking the obtained Pos as Pos2, the offset amount Tr along the radial direction between the read elements can be obtained as the difference in head position between Pos1 and Pos2 as shown by the following expression 6.

$$Tr=Pos2-Pos1 \hspace{2cm} \text{Expression 6}$$

As to the burst pattern at shipment, because servo burst regions Rbst in tracks in the outer circumference zone OD and tracks in the inner circumference zone ID practically do not have a Q-phase region (Null Q) as shown in FIG. 2D (or 2E) and FIG. 2A (or 2B), the processing shown by the expression 6 is intrinsically impossible, but this Q-phase region (Null Q) exists until a post-code is recorded, so that each of the head positions of the two read elements R1, R2 can be identified.

When the servo pattern is generated by SSW, a normal Null burst pattern is recorded onto the disk medium 111 regardless of which zone. By recording a post-code onto the servo pattern in the process, a final servo pattern having no Q-phase region is finally formed in the outer circumference zone OD and the inner circumference zone ID. That is, while in the middle circumference zone MD, a post-code is written such that the post-code comes immediately after the Q-phase region (Null Q), in the outer circumference zone OD and the inner circumference zone ID, a post-code is written immediately after the N-phase region (Null N), so that the Q-phase burst pattern (Null Q) is overwritten with the post-code so as to practically disappear.

As such, at a stage before the post-code post-recording process in the process, the relation between the radial position and the offset amount Tr can be obtained.

Figure 9:
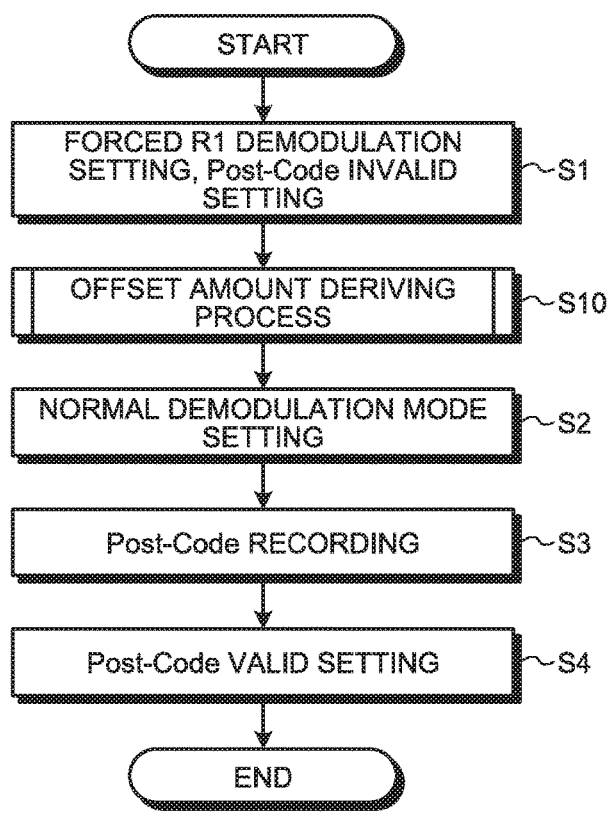
FIG. 9 is a flow chart illustrating the method of manufacturing the disk device according to the first embodiment.

More specifically, in the production process of the disk device 100, the amount Tr of the offset along the radial direction between the read elements is obtained as shown in FIG. 9. FIG. 9 is a flow chart illustrating the method of manufacturing the disk device 100 (the post-code post-recording process).

In the production process of the disk device 100, the patterns in the servo pattern as shown in FIG. 2B except the post-code are written onto each track of the disk medium 111. That is, the N-phase burst pattern (Null N) and Q-phase burst pattern (Null Q) are written onto the servo burst region Rbst in each track. For example, in a self servo write (SSW) method, after auxiliary servo patterns are written onto the disk medium 111 by a servo track writer (STW), a plurality of disk media 111 are mounted in a housing (not shown). Then the controller 130 performs positioning control using the auxiliary servo patterns and so on while advancing the head 122 from the inner circumference side to the outer circumference side, thereby performing a variety of calibration. Then while advancing the head 122 by steps of a predetermined servo-track pitch Tw from the inner circumference side to a predetermined position using the auxiliary servo patterns, the controller 130 writes servo patterns simultaneously onto the plurality of disk media 111. Thus, a plurality of tracks are defined concentrically on each disk medium 111. Then the controller 130 executes the process of S1 to S4 (the post-code post-recording process) to post-record a post-code at the tail end of each servo pattern while controlling positioning at the center of each track using the servo patterns. The process of S1 to S4 may be executed collectively or individually for a plurality of heads 122 in the disk device 100. The case where the process of S1 to S4 is executed sequentially, individually for the heads 122 will be illustrated.

In the post-code post-recording process, the controller 130 performs forced R1 demodulation setting and post-code invalid setting (S1). According to the forced R1 demodulation setting (which fixes the demodulation mode at 0), the controller 130 performs servo processing which obtains the current head position Pos from the read signal φR1 of the read element R1 on the master side without using the read signal φR2 of the read element R2 so as to position the head 122 so that the current head position Pos comes close to a target position. According to the post-code invalid setting, the controller 130 erases magnetization in regions where a post-code is to be recorded in the servo areas of each track of the disk medium 111.

The controller 130 performs an offset amount deriving process which obtains the amount Tr of the offset along the radial direction between the read elements (S10). After obtaining the offset amount Tr, the controller 130 performs normal demodulation mode setting (which makes the demodulation mode selectable between =0 and =1 according to the radial position of the head 122) (S2). The post-code recording is performed to post-record a post-code at the tail end of each servo pattern (S3). At this time, as shown in FIGS. 2C, 4B, at a radial position to be in the middle circumference zone MD, a post-code is post-recorded immediately after the Q-phase burst pattern (Null Q). As shown in FIG. 2D or 2E, FIG. 2A or 2B, and FIGS. 4A, 4C, at a radial position to be in the outer circumference zone OD and at a radial position to be in the inner circumference zone ID, a post-code is post-recorded immediately after the N-phase burst pattern (Null N). By this means, at the radial position to be in the outer circumference zone OD and at the radial position to be in the inner circumference zone ID, part (most part) or all of the Q-phase burst pattern (Null Q) is erased. Then the controller 130 performs post-code valid setting (which makes correction using the post-code active) (S4).

Figure 10:
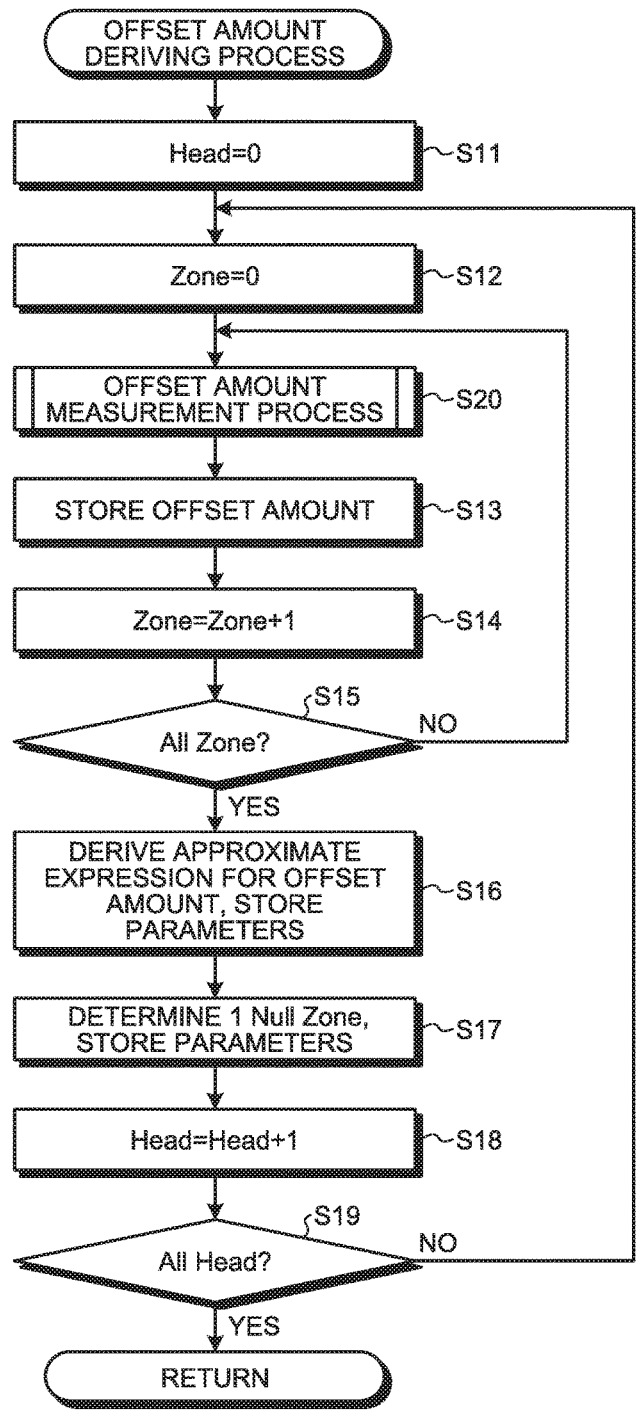
FIG. 10 is a flow chart illustrating an offset amount deriving process in the first embodiment.

Next, the offset amount deriving process (S10) will be described using FIG. 10. FIG. 10 is a flow chart illustrating the offset amount deriving process.

The controller 130 sets the number Head of the head to be processed to an initial value "0" (S11), sets the number Zone of the zone to be processed to an initial value "0" (S12), and performs an offset measurement process to measure the offset amount Tr (S20). The controller 130 stores information about the offset amount Tr (see FIG. 12) obtained by measurement at S20 into the nonvolatile memory 128 or onto a management information storage area of the disk medium 111 (S13). The controller 130 increments the number Zone of the zone to be processed (S14) and compares the zone number Zone with the specified number of zones to determine whether the process has been done at all radial positions to form the zones (S15). If the zone number Zone is less than or equal to the specified number of zones, the controller 130 determines that the process has not been done at all radial positions to form the zones (No at S15), and the process returns to S20. If the zone number Zone exceeds the specified number of zones, the controller 130 determines that the process has been done at all radial positions to form the zones (Yes at S15) and derives an approximate expression for the offset amount Tr to store parameters related to the derived approximate expression into the nonvolatile memory 128 or onto the management information storage area of the disk medium 111 (S16). The controller 130 reads management information stored on the management information storage area of the disk medium 111 and determines a zone "Null Zone" for which the offset amount Tr is not used in positioning the head 122 (e.g., the middle circumference zone MD) according to information about the skew angle β of the head 122 included in the management information so as to store parameters related to the zone "Null Zone" into the nonvolatile memory 128 or onto the management information storage area of the disk medium 111 (S17). The controller 130 increments the number Head of the head to be processed (S18) and compares the head number Head with the specified number of heads to determine whether the process has been done for all the heads (S19). If the head number Head is less than or equal to the specified number of heads, the controller 130 determines that the process has not been done for all the heads (No at S19), and the process returns to S12. If the head number Head exceeds the specified number of heads, the controller 130 determines that the process has been done for all the heads (Yes at S19) and finishes the process.

Figure 11:
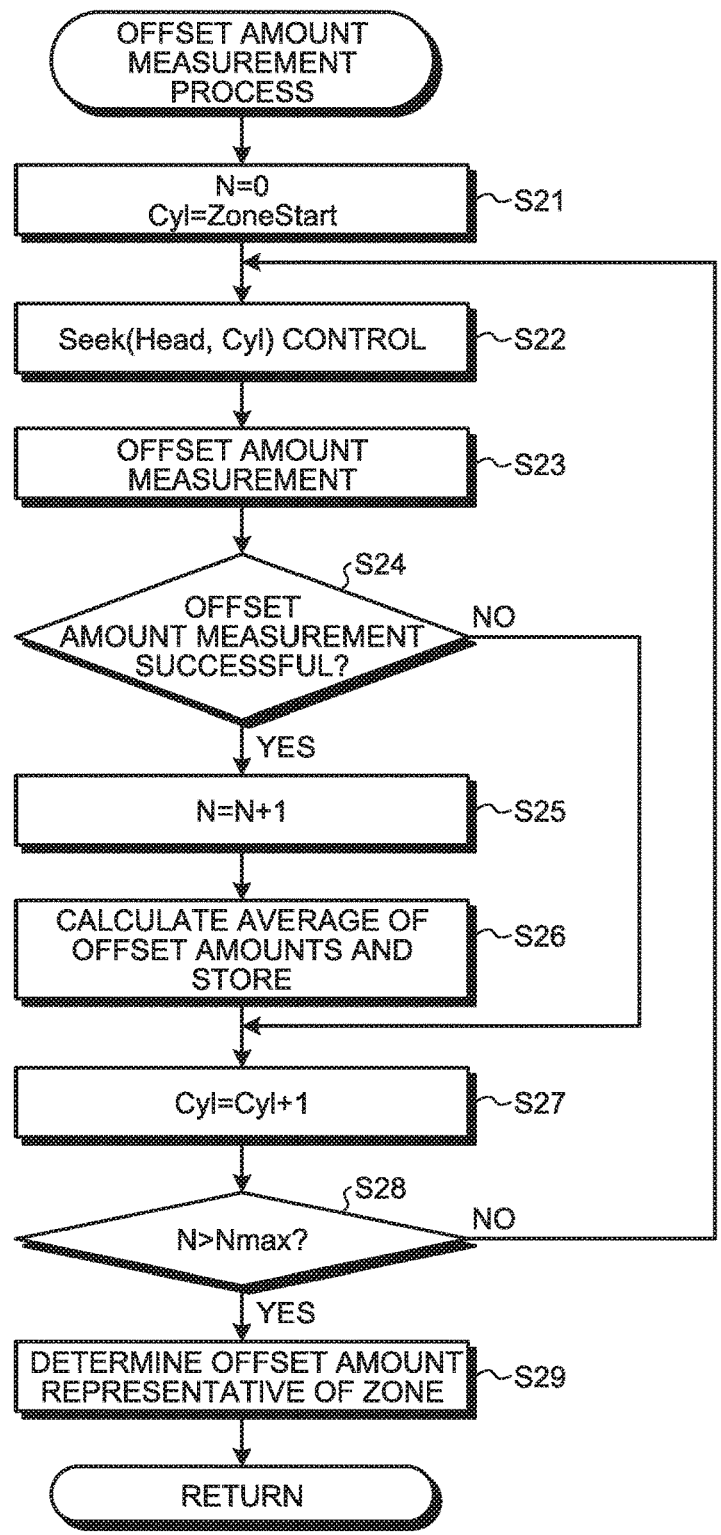
FIG. 11 is a flow chart illustrating an offset amount measurement process in the first embodiment.

Next, the offset amount measurement process (S20) will be described using FIG. 11. FIG. 11 is a flow chart illustrating the offset amount measurement process.

The controller 130 sets the number N of tracks to an initial value "0" and sets the track number Cyl to an initial value "ZoneStart" (S21). The controller 130 controls the head 122 to seek according to the head number Head and the track number Cyl (S22).

Then the controller 130 measures the offset amount Tr (S23). Specifically, the forced R1 position calculation flag is set, and the controller 130 performs the detection of the read element R1 position according to the forced R1 position calculation flag to acquire the current head position Pos1 of the read element R1. Then the forced R2 position calculation flag is set, and the controller 130 performs the detection of the read element R2 position according to the forced R2 position calculation flag to acquire the current head position Pos2 of the read element R2. The controller 130 can obtain the offset amount Tr as the difference in head position between Pos1 and Pos2 as shown by the expression 6.

For example, the result of measuring the offset amount Tr of each head at each radial position is as shown in FIG. 12. FIG. 12 is a graph illustrating results of measuring the offset amount. As shown in FIG. 12, variation in the offset amount Tr according to the radial position is different between the plurality of heads 122 in the disk device 100, and hence the offset amount Tr at each radial position needs to be measured for each head.

When succeeding in measuring the offset amount Tr (Yes at S24), the controller 130 increments the number N of tracks (S25) and calculates the average of the offset amounts Tr for the current zone to store into the buffer memory 129 (S26) and increments the track number Cyl (S27).

When failing in measuring the offset amount Tr (No at S24), with leaving the number N of tracks the same, the controller 130 increments the track number Cyl (S27).

The controller 130 determines whether the number N of tracks used to calculate the average of the offset amounts Tr exceeds a threshold Nmax (S28). When the number N of tracks is less than or equal to the threshold Nmax (No at S28), the controller 130 causes the process to return to S22. When the number N of tracks exceeds the threshold Nmax (Yes at S28), the controller 130 determines the average stored in the buffer memory 129 to be an offset amount Tr representative of the current zone to store into the nonvolatile memory 128 or onto the management information storage area of the disk medium 111 (S29).

Figure 13A:
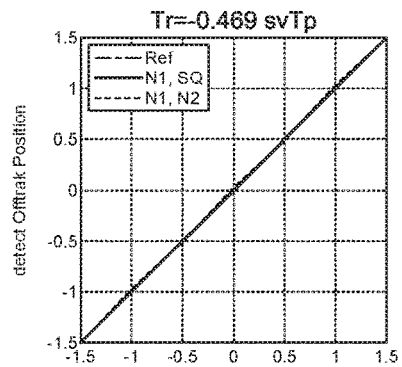
FIGS. 13A to 13P are graphs illustrating results of detecting the off-track amount of the head in the first embodiment.

Next, the results of detecting the off-track amount will be described using FIGS. 13A to 13P. FIGS. 13A to 13P are graphs illustrating results of detecting the off-track amount.

FIGS. 13A to 13D are graphs obtained by simulating for the results of position detection, assuming the case where the position detection is performed on channel burst values N1, N2 of Null N in the outer circumference zone OD (the radial position R=45 mm). FIGS. 13E to 13H are graphs obtained by simulating for the results of position detection, assuming the case where the position detection is performed on channel burst values N1, N2 of Null N in the outer circumference zone OD (the radial position R=41 mm). FIGS. 13I to 13L are graphs obtained by simulating for the results of position detection, assuming the case where the position detection is performed on channel burst values N1, N2 of Null N in the outer circumference zone OD (the radial position R=37 mm). FIGS. 13M to 13P are graphs obtained by simulating for the results of position detection, assuming the case where the position detection is performed on channel burst values N1, N2 of Null N in the inner circumference zone ID (the radial position R=21 mm).

In FIGS. 13A, 13E, 13I, and 13M, the horizontal axis represents the off-track amount, and the vertical axis represents the demodulation position. In FIGS. 13B, 13F, 13J, and 13N, the horizontal axis represents the off-track amount, and the vertical axis represents the detection error in position demodulation. FIGS. 13C, 13G, 13K, and 13O are Lissajous figures drawn with the vertical axis representing the BstN and the horizontal axis representing the BstQ. In these graphs, solid lines indicate the results of position detection of the first embodiment, and for reference, broken lines indicate the results of position detection with not performing SQ calculation but regarding N1, N2 with no change as BstN, BstQ.

In FIGS. 13D, 13H, 13L, and 13P, the horizontal axis represents the off-track amount, and the vertical axis represents the values of N1, N2, and SQ. In FIGS. 13D, 13H, 13L, and 13P, broken lines indicate N1, dot-dashed lines indicate N2, and solid lines indicate SQ.

Figure 13B:
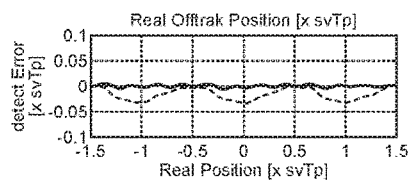
Figure 13C:
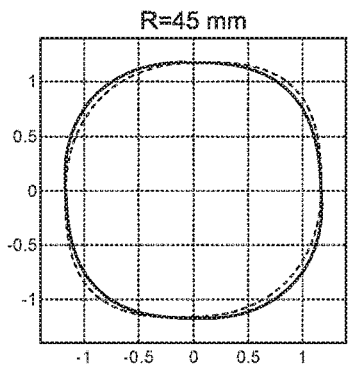
Figure 13D:
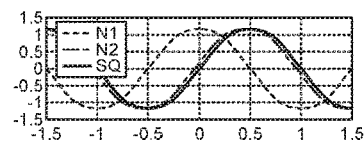
Figure 13E:
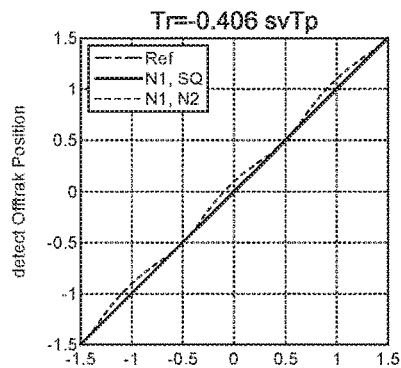
Figure 13F:
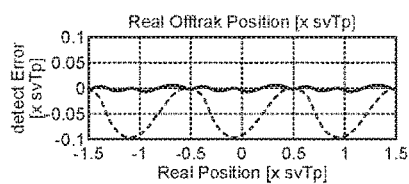
Figure 13G:
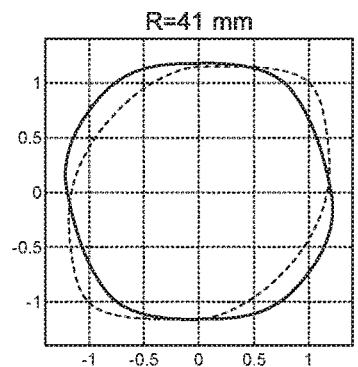
Figure 13H:
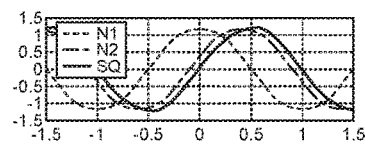
Figure 13I:
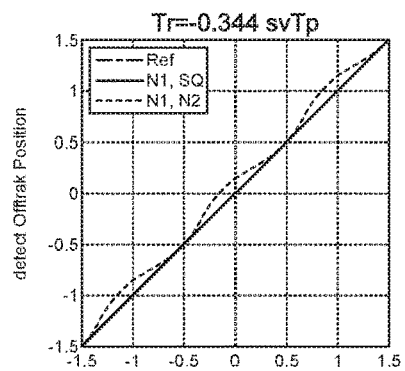
Figure 13J:
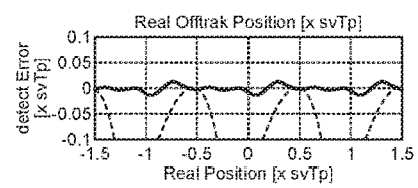
Figure 13K:
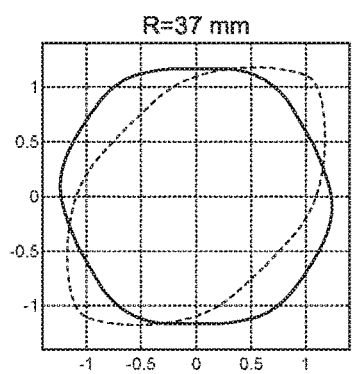
Figure 13L:
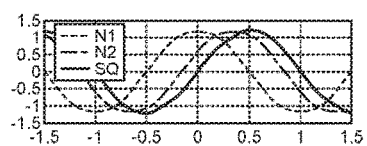
Figure 13M:
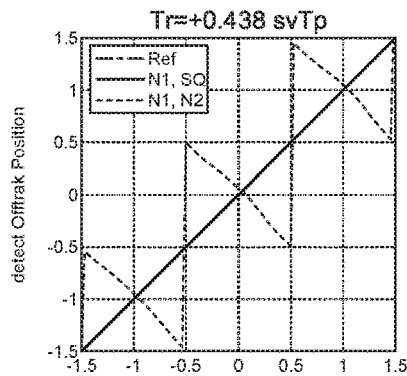
Figure 13N:
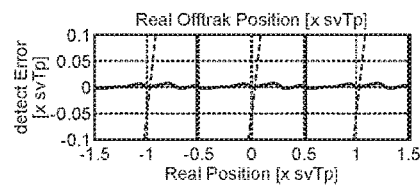
Figure 13O:
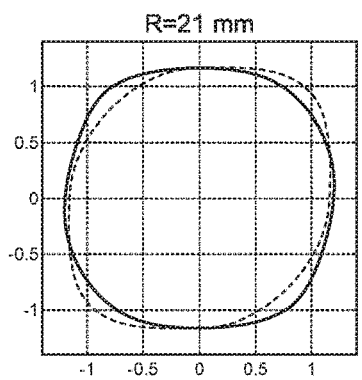
Figure 13P:
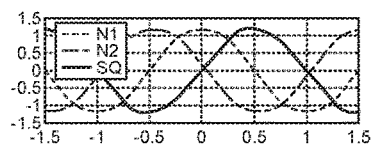

Referring to the broken-line graph of FIG. 13B, for the outer circumference zone OD (the radial position R=45 mm), N1, N2 are almost in an orthogonal system of sin and cos, and thus when the position detection is performed on them with no change, positions can be detected to some extent, but it is seen that there are position detection errors of about 3% compared with desirable original position detection. In contrast, referring to the solid line graph of FIG. 13B, it can be confirmed that, by adopting the position detection of the first embodiment, ideal position detection with almost no position detection error can be realized.

As such, in the first embodiment, in the disk device 100, the disk medium 111 is formed such that the bit length of the servo burst regions Rbst of tracks in the inner circumference zone ID and the outer circumference zone OD is shorter than the bit length of the servo burst regions Rbst of tracks in the middle circumference zone MD. By this means, the area of the data areas DA in the disk medium 111 can be increased, so that the data capacity of the disk medium 111 is easily improved.

In the disk medium 111, each zone (the outer circumference zone OD, the middle circumference zone MD, and the inner circumference zone ID) may be further partitioned into a plurality of sub-zones along the radial direction, and the servo pattern may be formed such that the repetition length L along the radial direction of the NULL burst of a sub-zone closer to the outer circumference is longer. That is, the servo track pitch Tw in SSW may be variable for each of the plurality of sub-zones partitioned into along the radial direction. For example, each zone in the outer circumference zone OD, the middle circumference zone MD, and the inner circumference zone ID may be partitioned into two sub-zones, and the servo track pitch Tw of the pattern may be different for each sub-zone.

As the absolute value of the skew angle in the disk medium 111 becomes smaller, the linearity of demodulation of the off-track amount with the burst pattern is more likely to degrade, but because the repetition length L of the burst pattern is about twice the servo track pitch Tw (see FIG. 6), Expression 1 can be rewritten as the following Expression 7.

$$\theta r = \pi \frac{Tr}{Tw} \qquad \text{Expression 7}$$

By changing this servo track pitch Tw, as shown in the expression 7, the phase difference θr can be changed to be close to 90° without changing the off-track amount Tr, so that the linearity can be improved.

Specifically, the linearity can be improved by making the servo track pitches Tw of sub-zones on the middle circumference side in the outer circumference zone OD and of sub-zones on the outer circumference side in the middle circumference zone MD higher than the servo track pitch Tw of sub-zones on the outer circumference side in the outer circumference zone OD. Likewise, the linearity can be improved by making the servo track pitches Tw of sub-zones on the middle circumference side in the inner circumference zone ID and of sub-zones on the inner circumference side in the middle circumference zone MD higher than the servo track pitch Tw of sub-zones on the inner circumference side in the inner circumference zone ID.

Or the linearity can be improved by making the servo track pitch Tw of sub-zones on the middle circumference side in the outer circumference zone OD higher than that of sub-zones on the outer circumference side in the outer circumference zone OD and making the servo track pitch Tw of sub-zones on the outer circumference side in the middle circumference zone MD higher than that of sub-zones on the middle circumference side in the outer circumference zone OD. Likewise, the linearity can be improved by making the servo track pitch Tw of sub-zones on the middle circumference side in the inner circumference zone ID higher than that of sub-zones on the outer circumference side in the inner circumference zone ID and making the servo track pitch Tw of sub-zones on the inner circumference side in the middle circumference zone MD higher than that of sub-zones on the middle circumference side in the inner circumference zone ID.

For example, sub-zones on the outer circumference side in the outer circumference zone OD and sub-zones on the inner circumference side in the inner circumference zone ID can be formed with a servo track pitch Tw of 500 kTPI, and sub-zones on the middle circumference side in the outer circumference zone OD, sub-zones on the outer circumference side in the middle circumference zone MD, sub-zones on the inner circumference side in the middle circumference zone MD, and sub-zones on the middle circumference side in the inner circumference zone ID can be formed with a servo track pitch Tw of 550 kTPI, 10% higher. By this means, the phase angles θr of sub-zones on the middle circumference side in the outer circumference zone OD, sub-zones on the outer circumference side in the middle circumference zone MD, sub-zones on the inner circumference side in the middle circumference zone MD, and of sub-zones on the middle circumference side in the inner circumference zone ID can be made greater, so that the dependence influence of N2 can be suppressed to a small one. Or with the servo track pitch Tw of addresses being constant, by changing the advance in forming Null regions from ½ advance to ⅓ advance, the L can be reduced to two thirds.

Either way, by making the repetition length L along the radial direction of the self-servo-written burst pattern vary along the radial direction so as to make the phase difference θr close to 90°, the linearity of position detection can be improved.

Second Embodiment

Next, description regarding a disk device 200 according to a second embodiment is presented. Hereinafter, the description is mainly focused on differences from the first embodiment.

The first embodiment exemplifies a case where, during tracking operation of the head 122, with regards to the tracks in the inner circumference zone ID and the outer circumference zone OD in which the servo region substantially do not include Q-phase burst pattern (Null-Q), a conversion corresponding to the expression 5 is performed to obtain a signal corresponding to Q1 so that the offtrack amount can be calculated with using N1 and SQ.

Meanwhile, during seeking operation of the head 122, the expression 5 is not held due to an effect of velocity (i.e., radial component of velocity vector when the head 122 moves in relative to servo tracks) of the head 122.

Accordingly, the second embodiment expands the conversion corresponding to the expression 5 into a conversion in consideration of the velocity of the head 122 to obtain the signal corresponding to Q1 by the expanded conversion so that the offtrack amount can be calculated with using N1 and SQ even when seeking operation of the head is performed.

Specifically, with regards to the tracks in the inner circumference zone ID and the outer circumference zone OD in which the servo region substantially do not include Q-phase burst pattern (Null-Q), reproduction method of Null N single burst pattern is expanded so that appropriate position detection can be done in consideration of velocity of the head 122. That is, for-TDMR null burst converting unit obtains, based on current head position, effective Tr correcting radial direction between read elements (cross track separation) decided on radial position and expands the expression for the conversion so that equivalent value to Null Q output in the case of head having velocity to generate a value corresponding to BstQ. Let the velocity of the head 122 when seeking as V, circumferential direction between read elements (down track separation) as DTS, radial direction between read elements (cross track separation) as CTS, with using coefficient $k_v$ obtained by the following expression 8, the radial offset amount Tr is obtained as effective cross track separation CTS when seeking, as indicated by the following expression 9. In addition, the following expression 10 obtains phase angle α of servo burst signal's gap depending on the velocity, the following expression 11 obtains effective phase difference θr' of delay or advancement for the read signal φR1, φR2 with using the phase angle α, and then the following expression 12 converts the effective phase difference θr' into SQ signal which is a signal corresponding to Q1. It should be noted that the offset amount Tr as effective cross track separation CTS is calculated as an amount indicating a radial offset of trajectory between read heads.

$$k_v = \frac{DTS}{2\pi r \cdot F_{SPM}} \qquad \text{Expression 8}$$

$$Tr = CTS + k_v \cdot V \qquad \text{Expression 9}$$

$$\alpha = \pi \frac{W(v)}{Tw} = m_V \cdot V \qquad \text{Expression 10}$$

$$\theta r' = \theta r - 2\alpha \qquad \text{Expression 11}$$

$$SQ = (N1 \cdot \cos\theta r' - N2 \cdot \cos 2\alpha)/\sin\theta r \qquad \text{Expression 12}$$

More specifically, the expression 5 has a premise that the velocity of the head 122 is small enough to be neglected and that both the head 122 running on a region of BstN and the head 122 running on a region of BstQ have the same phase θ. However, when the head 122 moving fast such as seeking operation, radial positions for BstN and Bst Q can shift with each other. Explanation about this is presented with using FIG. 14.

Figure 14:
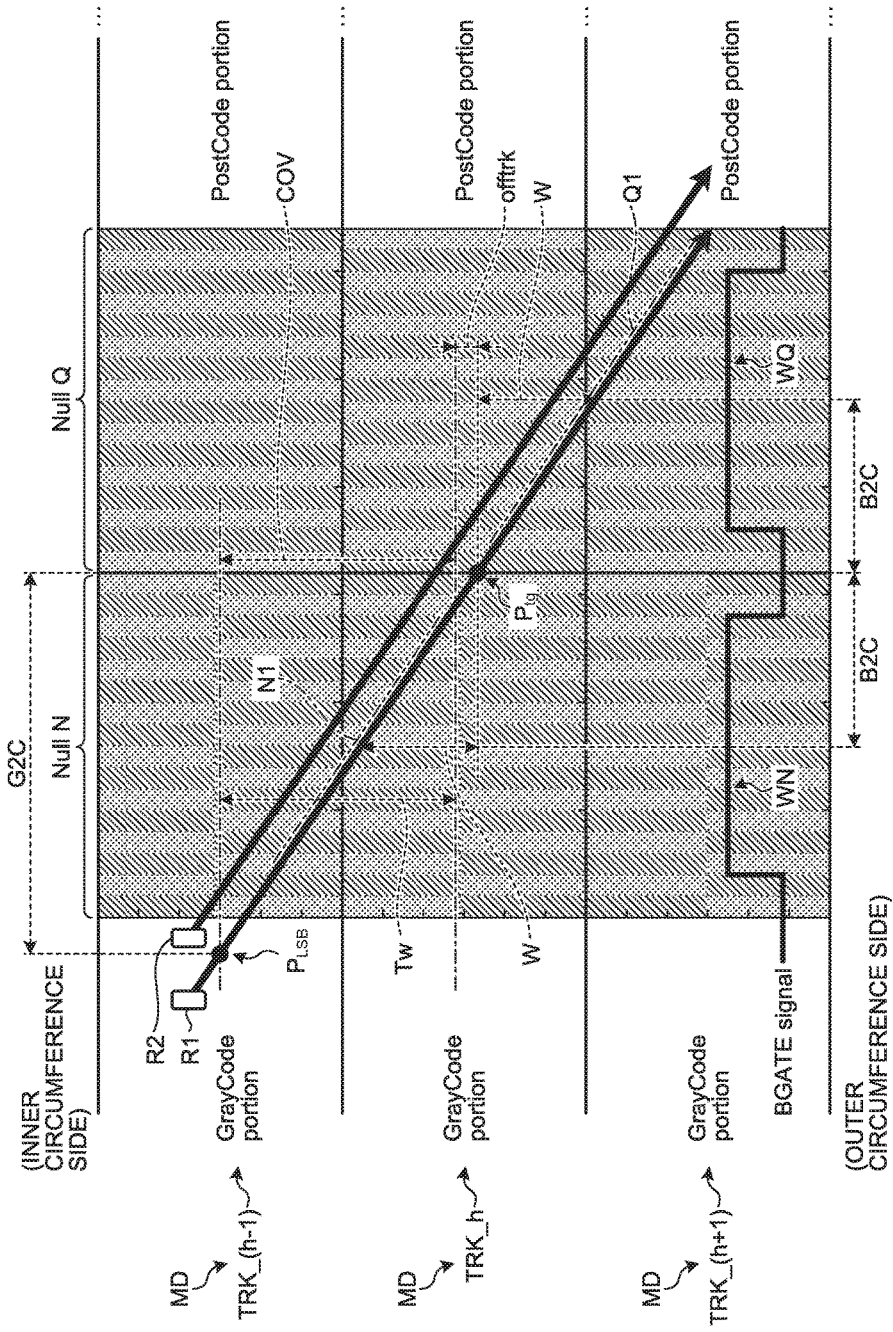
FIG. 14 is a diagram illustrating an offset amount deriving process in a second embodiment.

FIG. 14 illustrates trajectories of the read elements R1, R2 on the servo patterns when the head 122 is seeking on the track TRK_(h−1) to TRK_(h+1) in the middle circumference zone MD where the servo region includes the N-phase burst pattern and the Q-phase burst pattern. FIG. 14 exemplifies a case where the rotation of the disk medium 111 causes the read element R1 and the read element R2 to move from upper left to lower right. The Null-N and Null-Q are formed in shifted phases with Tw/2 along radial direction and are patterns with phase difference of 90 degree along radial direction.

In order to obtain a current position of the head 122 during seeking operation, the burst output of the channel is calculated as average amplitude by adding signal amplitude of ON section (window WN, WQ) of BGATE signal with using discrete Fourier transform (DFT). N1 depicted by two-dot chain line in FIG. 14 is a trajectory of the read element R1 on the Null-N, Q1 depicted by two-dot chain line in FIG. 14 is a trajectory of the read element R1 on the Null-Q. When the read element R1 is a master read element, although the position dPos to be obtained as θ (i.e., the offtrack amount of target position Ptg) is a position which is offtracked from center position of Null pattern depicted by one-dot chain line in FIG. 14, it should be understood that N1 output corresponds to a value returning back by W (i.e., a value corresponding to a position returning back by B2C along the circumferential direction). In reverse, Q1 output corresponds to a value passing over by W (i.e., a value corresponding to a position passing over by B2C along the circumferential direction).

In short, the relationship of the expression 3 which is used for deriving the expression 5 is not held during seeking operation.

Explanation about how the operations are conducted in the burst demodulation process of the middle circumference zone MD where the servo region includes the N-phase burst pattern and the Q-phase burst pattern is presented with using FIG. 14.

Since N1 is a value returning back by W along the radial direction with respect to θ and Q1 is a value passing over by W along the radial direction with respect to θ, if the shift amount W with velocity dependency is phase-angle-converted, the expression obtained by expanding the expression 3 is the following expression 13.

$$N1 = a \cdot \cos(\theta - \alpha), Q1 = a \cdot \sin(\theta + \alpha) \quad \text{Expression 13}$$

In the expression 13, the coefficient 'a' denotes a coefficient indicating a deterioration of the amplitude of read signal φR1 by the oblique running of the head. The phase angle α indicates a phase angle corresponding to shift of servo burst signal by velocity dependence and can be obtained by the following expression 14.

$$\alpha = \pi \frac{W}{Tw} = m_V \cdot V \quad \text{Expression 14}$$

In the expression 14, W denotes a radial distance decided by the time corresponding to the circumferential distance B2C and the velocity and therefore can be directly calculated from the velocity (the velocity of the head) V by phase-angle-conversion coefficient $m_v$.

Explanation has already done about that the radial position conversion is processed in the off-track amount calculating unit 137, if the expression of principle is presented, which is processed as the expression 2. However, since the off-track amount calculating unit 137 actually performs velocity correction process, in a precise sense, the radial position conversion is processed as the following expression 15. Although the expression 2 uses burst period length L and the expression 15 uses the servo track width Tw, since L=2*Tw, those expressions are equivalent with regards to the coefficients. The difference from the expression 2 is that BstQ/BstN is replaced by AS/AC, and AS, AC are values obtained by velocity-correcting BstQ, BstN by the following expression 16.

$$\mathit{offtrk} = \frac{Tw}{\pi}\theta = \frac{Tw}{\pi}\tan^{-1}(\sin\theta/\cos\theta) = \frac{Tw}{\pi}\tan^{-1}(AS/AC) \quad \text{Expression 15}$$

The velocity correction is a calculation process which can cancel phase angle α corresponding to shift depending on the velocity by the expression 13, and is a calculation process where, as the following expression 16, cos α and sin α which are pre-decided from the current velocity (the velocity of the head 122) V by using the expression 14 are multiplied and added. When the velocity can be neglected, 'cos α=1, sin α=0' can be true, 'AS=BstQ, AC=BstN' can be true, the expression 15 can match with the expression 2 completely.

$$AC = \cos\alpha \cdot BstN - \sin\alpha \cdot BstQ, AS = \cos\alpha \cdot BstQ - \sin\alpha \cdot BstN \quad \text{Expression 16}$$

If assuming 'BstN=N1, BstQ=Q1' in the expression 16 and then introducing the expression 13 to be developed, the following expression 17 is obtained, which clarifies the appropriateness of the expression 15 which replaces AC for BstN of the expression 2 and As for BstQ.

$$AC = k_v \cdot a \cdot \cos\theta, AS = k_v \cdot a \cdot \sin\theta, k_v = \cos^2\alpha \cdot \sin^2\alpha \quad \text{Expression 17}$$

It should be understood that AC, AS fall within the relationship of cos and sin for the same phase angle θ and that the velocity correction by the expression 17 can correctly calculate the phase angle θ.

It should be noted that the obtained phase angle θ is a value corresponding to offtrk and therefore includes shift amount from gray cylinder reproduce when reading (i.e., the position indicated by the cylinder address of gray code). Although the head is running obliquely when reading gray code, the reproduced address corresponds to the position $P_{LSB}$ where the least significant bit (LSB) of the gray code is located. It should be noted that, although the least significant bit (LSB) is located on end edge of the gray code region normally, if scrambled arrangement is adapted, the least significant bit (LSB) is not always located on end edge of the gray code region. From the position $P_{LSB}$ of the least significant bit (LSB) of the gray code, the time corresponding to distance G2C to the center of Null, and the velocity, radial shift amount COV from the position $P_LSB$ of FIG. 14 to the track center of track TRK_h including the target position Ptg. Although the radial shift amount COV can actually include decimal number smaller than cylinder unit, since the precise position can be obtained from offtrk (the offtrack amount of the target position Ptg), the radial shift amount COV can be added by an integer to obtain the position POS as the following expression 18.

$$POS = P(\text{gray}) + int(COV) + \text{offtrk} \quad \text{Expression 18}$$

In this way, it should be understood that, even if the demodulated value of the middle circumference zone MD where the servo region includes the N-phase burst pattern and the Q-phase burst pattern has the effect of velocity as in the expression 13, the velocity correction process of the expression 16 which is performed in the existing off-track amount calculating unit 137 can calculate the offtrack amount correctly. Meanwhile, the demodulated value of the inner circumference zone ID or outer circumference zone OD where the servo region does not substantially include the Q-phase burst pattern (Null Q) is need to generate SQ corresponding to Q1 of the expression 13 by N-phase demodulated values N1 and N2 of R1 and R2. Although, if downtrack-direction velocity of the current head can be neglected, the expression 5 can be used to calculate SQ, if the velocity is difficult to be neglected, the conversion in consideration of the velocity. In other words, for-TDMR null burst converting unit of FIG. 7 needs to be expanded in consideration of the velocity of the current head so that the velocity correction performed in the off-track amount calculating unit 137 functions correctly.

Figure 15:
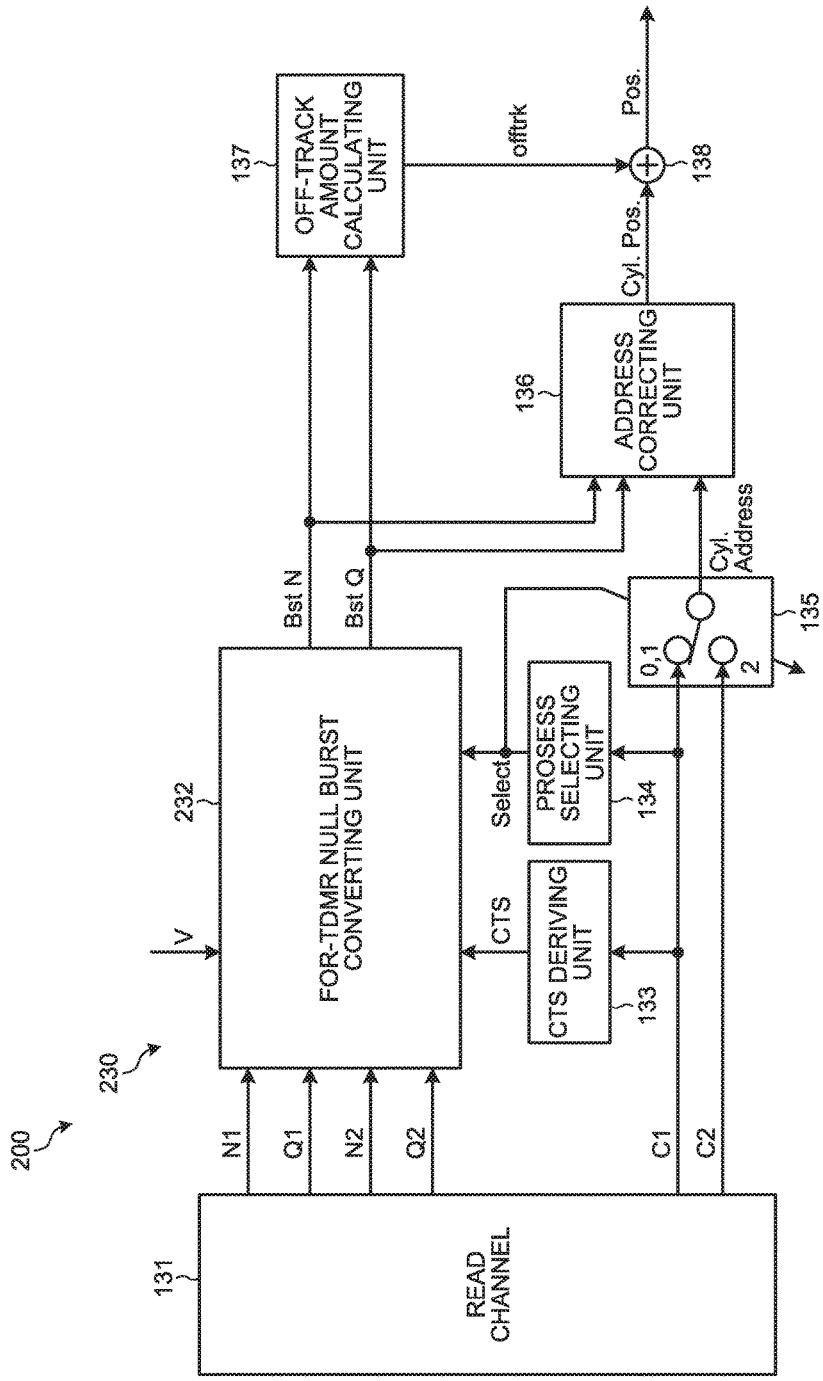
FIG. 15 is a diagram illustrating the configuration of a controller in the second embodiment.
Figure 16:
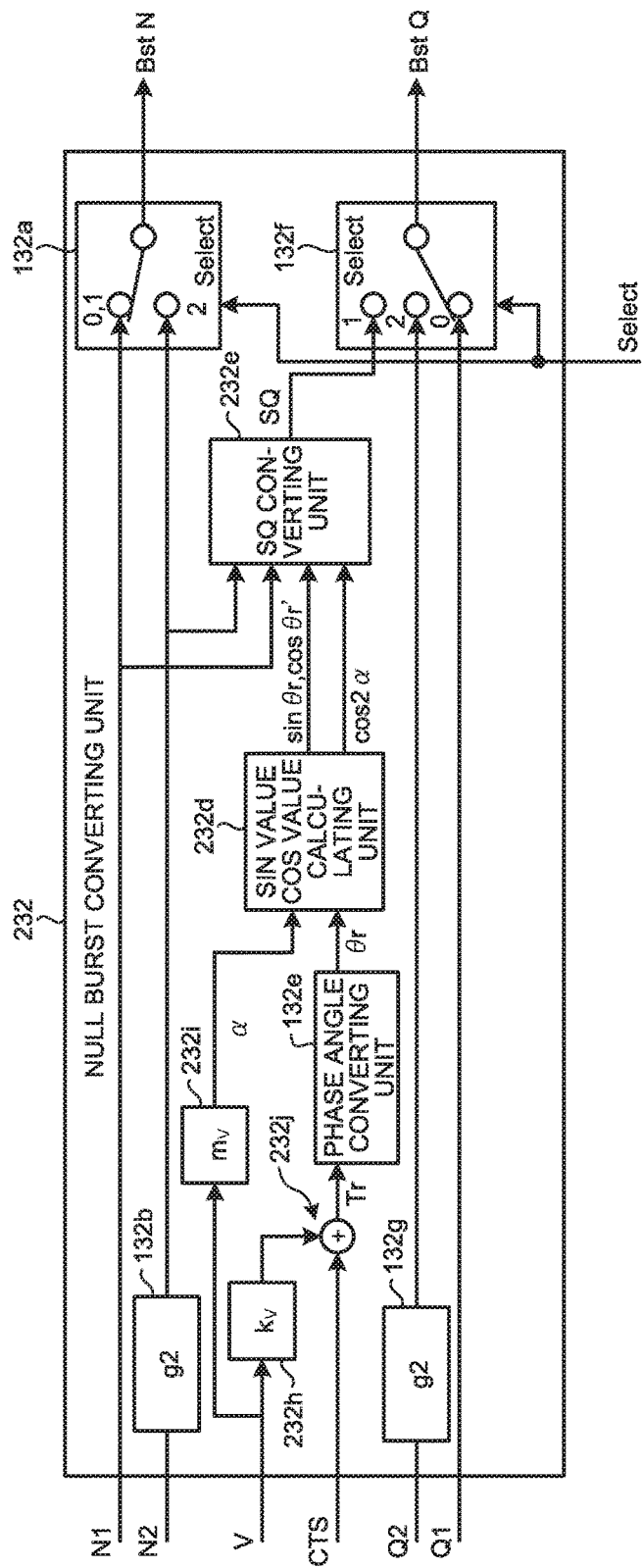
FIG. 16 is a diagram illustrating the configuration of a NULL burst converting unit in the second embodiment.

For example, the disk device 200 has the controller 230 as depicted in FIG. 15 in substitute for the controller 130 (see FIG. 7). FIG. 15 is a diagram illustrating the configuration of a controller 230. The controller 230 has null burst converting unit 232 in substitute for the null burst converting unit 132 (see FIG. 7), which is different from the first embodiment. It should be noted that, although FIG. 7 depicts output of the CTS deriving unit 133 as Tr (radial offset amount of trajectory of read elements), when the head has radial velocity, the radial offset amount Tr does not always match with radial distance CTS between elements. Therefore, FIG. 15 changes the output of the CTS deriving unit 133 to CTS to provide CTS to the null burst converting unit 132.

The CTS deriving unit 133 derives, depending on addresses (e.g., track numbers) indicated by the demodulated results C1 of the gray code, radial direction CTS at the current radial position to provide the CTS to the null burst converting unit 232. The controller 230 can estimate the velocity of the head 122 based on the current instruction value to the VCM 116 and can provide the estimated velocity of the head 122 to the null burst converting unit 232.

The null burst converting unit 232 is expanded to perform the conversion process with reference to the velocity of the head 122, which is different from the first embodiment. The null burst converting unit 232 has sin value cos value calculating unit 232d and SQ converting unit 232e in substitute for sin value cos value calculating unit 132d and SQ converting unit 132e (see FIG. 8), and further has the coefficient multiplying unit 232h, the coefficient multiplying unit 232i, and adder 232j.

Although the null burst converting unit 132 of the first embodiment input, as Tr (radial offset amount of trajectory of read elements), radial distance CTS at current radial position calculated in CTS deriving unit 133 with interpolation calculation by optimization parameters, the null burst converting unit 132 of the present embodiment further adds process where using radial velocity of head 122 the radial offset amount Tr of trajectory of read elements which changes depending on the velocity. That is, the coefficient multiplying unit 232h multiplies the velocity V of the head with the coefficient $k_v$ (see the expression 9). The adder 232j adds multiplied results ($k_v$*V) of the coefficient multiplying unit 232h to radial distance CTS to obtain the offset amount Tr and provide it to the phase angle converting unit 132e. In this way, the process indicated in the expression 9 is conducted.

Further, phase angle α for the velocity correction which changes depending on the velocity is obtained. That is, the coefficient multiplying unit 232i multiplies the velocity V of the head with the coefficient $m_v$ (see the expression 10), and provides the sin value cos value calculating unit 232d with the multiplied results as phase angle α corresponding to shift amount depending on the velocity. In this way, the process indicated in the expression 10 is conducted. And the phase angle converting unit 132e converts the offset amount Tr into phase difference θr corresponding to delay or advancement between two read elements to provide it to the sin value cos value calculating unit 232d. In this way, the process indicated in the expression 1 or the expression 7 is conducted.

The sin value cos value calculating unit 232d receives the phase angle α corresponding to shift amount from the coefficient multiplying unit 232i and receives the phase difference θr corresponding to the offset amount Tr form the phase angle converting unit 132e. The sin value cos value calculating unit 232d performs the following calculation in addition to calculating sin θr with using the phase difference θr. The sin value cos value calculating unit 232d obtains effective phase difference θr' with velocity dependency with using phase angle α corresponding to shift amount with velocity dependency and the phase difference θr corresponding to the offset amount Tr by the expression 11, and calculates cos θr' with using the effective phase difference θr' with velocity dependency. The sin value cos value calculating unit 232d calculates cos 2α with using phase angle α corresponding to shift amount with velocity dependency. The sin value cos value calculating unit 232d provides SQ converting unit 232e with those calculated results (sin θr, cos θr', cos 2α).

The content of the conversion process conducted by the SQ converting unit 232e is, in substitute for the expression 5, more expanded expression 12, which is different from the first embodiment.

If the velocity is almost zero, the expression 9 provides 'Tr=CTS', the expression 10 provides 'α=0', the expression provides 'θr'=θr' and therefore the expression 12 can match with the expression 5. That is, it can be said that the expression 12 is an expression that can include the expression 5 as the expression for the case of the velocity=0 and that can deal with the case of the velocity≠0.

Introducing the expressions 4, 11 to the expression 12 to be developed and to replace the coefficient portion as 'a' leads to the following expression 19.

$N1=a\cdot\cos(\theta-\alpha), SQ=a\cdot\sin(\theta+\alpha)$   Expression 19

Here, regarding the difference between the expression 5 and the expression 12, the explanation is made with using FIGS. 17A and 17B. FIGS. 17A and 17B are diagrams illustrating offset amounts deriving process. FIG. 17A is a diagram illustrating SQ converting process when the head 122 performs tracking operation, and FIG. 17B is a diagram illustrating SQ converting process when the head 122 performs seeking operation.

When he head 122 performs tracking operation (i.e., radial velocity V=0), as indicated in FIG. 17A, SQ obtained by the expression 5 from N1 and N2 about the track TRK_r of the outer circumference zone OD can be a signal corresponding to Q1 for the track TRK_h of the middle circumference zone MD.

Meanwhile, when the head 122 performs seeking operation (i.e., radial velocity V#0), as indicated in FIG. 17B, SQ obtained by the expression 5 from N1 and N2 about the track TRK_r of the outer circumference zone OD tends to be topologically shifted (corresponding to shift amount 2W at the radial position) from a signal corresponding to Q1 for the track TRK_h of the middle circumference zone MD. By considering the phase angle α corresponding to shift amount (corresponding to shift amount 2W at the radial position), as depicted in FIG. 17B, SQ obtained by the expression 12 from N1 and N2 about the track TRK_r of the outer circumference zone OD can be a signal corresponding to Q1 (see FIG. 14) for the track TRK_h of the middle circumference zone MD.

Figure 18A:
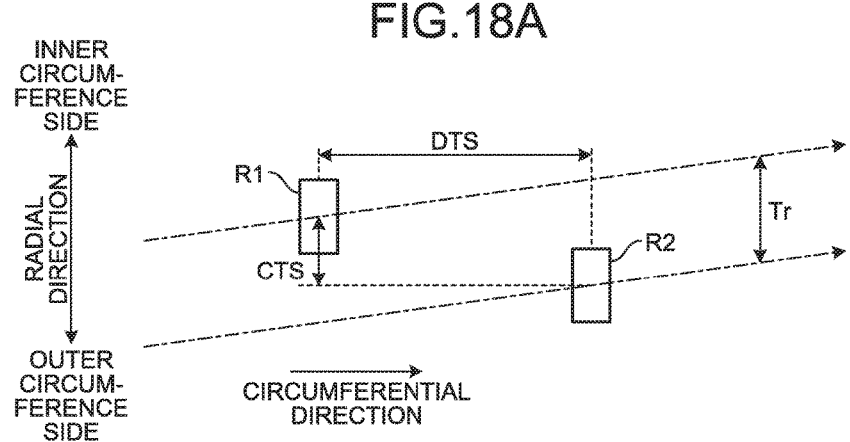
FIGS. 18A to 18C are diagrams illustrating offset amounts for different velocities of a head in the second embodiment.
Figure 18B:
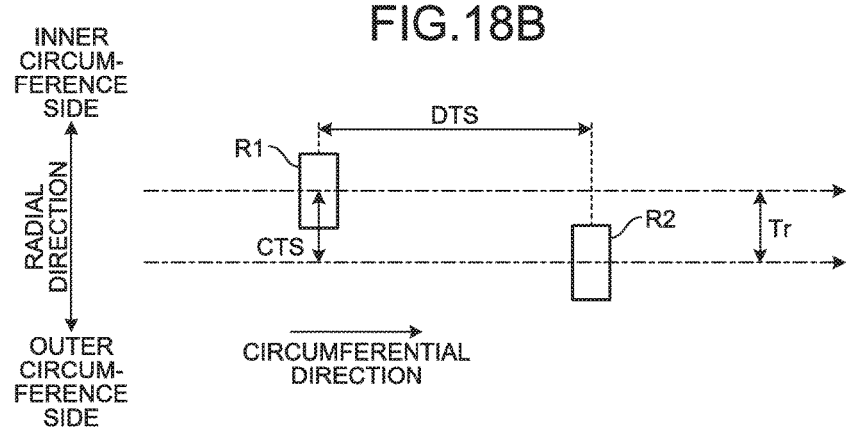
Figure 18C:
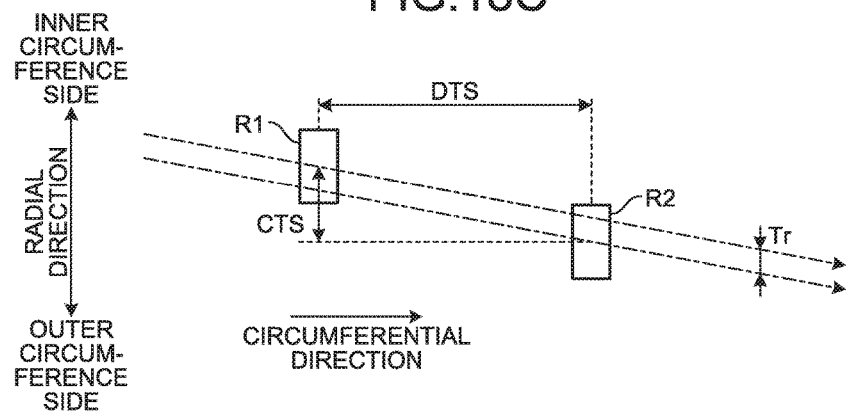

Next, the explanation about why changing the offset amount Tr calculated as the offset of trajectory between read elements is made with using FIGS. 18A to 18C. FIGS. 18A to 18C illustrates changes of the offset amount Tr (effective amount of radial distance CTS) depending on the velocity.

Considering the structure of the head 122, two read elements R1, R2 have the distance called as R-R Gap. R-R Gap is a vector amount including CTS as radial component and DTS as circumferential component, which means that two read elements R1, R2 are arranged with radial offset distance CTS and circumferential offset distance DTS. With this structure, when the head 122 moves at velocity V in the radial direction, the offset amount Tr indicating radial offset amount at the position passing the Null burst pattern needs to be corrected not by radial distance CTS between read elements but by circumferential distance DTS between read elements and the velocity.

For example, when the read element R1 offsets by CTS in inner side of radial direction in relative to the read element R2, if performing tracking operation (i.e., radial velocity V=0) as depicted in FIG. 18B, the offset amount Tr becomes equal to radial distance CTS between read elements. Meanwhile, if the head 122 moves toward inner side by velocity V, the offset amount Tr becomes larger than radial distance CTS depending on the velocity V. Alternatively, if the head 122 moves toward outer side by velocity V, the offset amount Tr becomes larger than radial distance CTS depending on the velocity V.

That is, the offset amount Tr as effective radial distance CTS can be obtained by multiplying the radial distance CTS at its radial position with correction component of the expression 9.

Coefficient $k_v$ in the expression 9 is a coefficient obtained by the expression 8. In the expression 8, 'r' denotes the current head position, Fspm denotes rotation frequency.

As is understood by the expression 8, $k_v$ is a coefficient depending on the radial position, and circumferential distance DTS also changes depending on the radial position, which changes by skew angle β as 'RR–Gap*cos β'.

Figure 19:
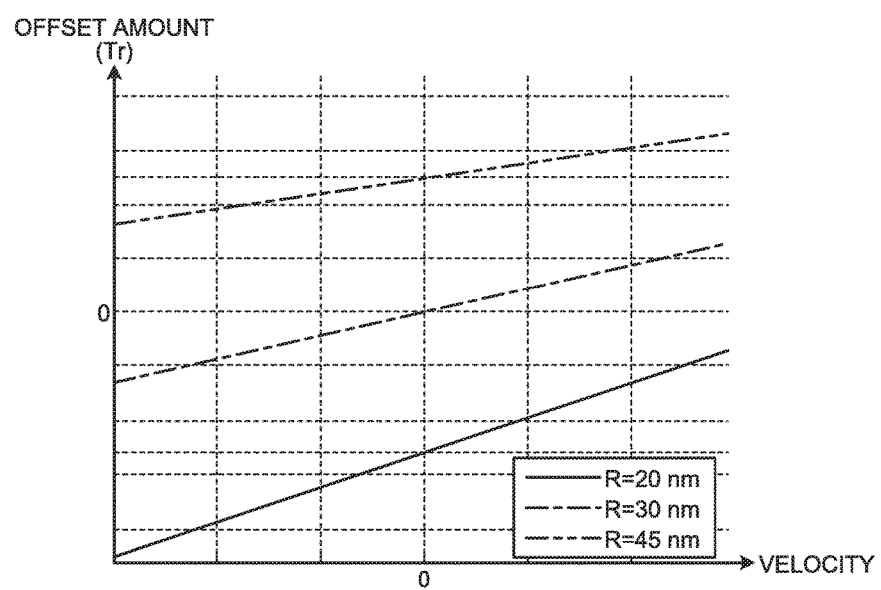
FIG. 19 is a diagram illustrating a relationship between offset amounts and velocities of the head in the second embodiment.

FIG. 19 illustrates the changes of the offset amount Tr by the velocity during seeking operation in the present embodiment. The inner circumference zone ID, middle circumference zone MD, and outer circumference zone OD are respectively depicted by solid line, one-dot line, two-dot line, which indicates that their gradient coefficients of the offset amount at the radial position with respect to the velocity are different from each other.

Although direct calculation of those gradient coefficients is possible, since the calculation is very complex, actually adapted is the scheme that before shipment for each head those gradient coefficients are pre-calculated at radial position of each zone and in the process afterward the coefficient $k_v$ is updated by the interpolation calculation. That is, the controller 230 can update the coefficient $k_v$ in the coefficient multiplying unit 232h of the null burst converting unit 232 and the coefficient $m_v$ in the coefficient multiplying unit 232i sequentially according to the current radial position. With this process even during seeking operation precise head position can be calculated.

It should be additionally noted that the controller 230, determines whether its address exceeds the threshold value to conduct switching of the selector 132a and 132f in the null burst converting unit 232 depicted in FIG. 15.

At this time, although no problem is posed by selecting 'Select=1' at the radial position in the middle circumference zone MD where the servo region includes the N-phase burst pattern (Null N) and the Q-phase burst pattern (Null Q), it is possible that the position is incorrectly demodulated by selecting 'Select=0' at the radial position in the inner circumference zone ID, outer circumference zone OD where the servo region substantially does not include the Q-phase burst pattern (Null Q). For this reason, selector switching radial address can be set to shift by the margin in consideration of the radial velocity of the head 122 and the time needed to the switching operation so that the address lies within normal servo region of the middle circumference zone MD. That is, within the middle circumference zone MD, adjacent region MID adjacent to the inner circumference zone ID is provided with radial width corresponding to the margin, and adjacent region MOD adjacent to the outer circumference zone OD is provided with radial width corresponding to the margin.

For example, if the head 122 seeks toward inner side within the middle circumference zone MD, the switching 'Select=1→0' is performed at the position reaching the adjacent region MID. That is, before reaching the inner circumference zone ID, the switching from normal conversion process to conversion process by the expression 13 can be done to calculate the offtrack amount by using N1 and SQ. As mentioned earlier, since SQ in the expression 12 can correspond to Q1 in the expression 13, it is possible to avoid discontinuity of offtrk output from off-track calculating unit and to execute smooth seeking operation.

Alternatively, for example, if the head 122 seeks toward outer side within the middle circumference zone MD, the switching 'Select=1→0' is performed at the position reaching the adjacent region MOD. That is, before reaching the outer circumference zone OD, the switching from normal conversion process to conversion process by the expression 13 can be done to calculate the offtrack amount by using N1 and SQ.

As such, in the second embodiment, regarding the tracks in the inner circumference zone ID and the outer circumference zone OD, the conversion process corresponding to the expression 5 is expanded to the conversion process in consideration of the velocity of the head and SQ corresponding to Q1 is obtained by the expanded conversion process. With this process, even when performing the seeking operation of the head 122, it is possible to calculate the offtrack amount with using N1 and SQ and therefore the position of the head 122 can be demodulated correctly.

Third Embodiment

Next, description regarding a disk device 300 according to a third embodiment is presented. Hereinafter, the description is mainly focused on differences from the first embodiment and the second embodiment.

The third embodiment exemplifies a case where, as shown in FIGS. 20A to 20D, the head 122' may have a third read element R3 in addition to two read elements R1, R2. FIGS. 20A to 20D are diagrams illustrating the configuration of the head 122' in the third embodiment. In the configuration, the three read elements R1, R2, R3 are placed such that the remaining one read element is offset from a straight line joining the centers of two read elements. In the head 122', the three read elements R1, R2, R3 are placed in a positional relation in which the line segment joining the centers of the read elements R1, R2, the line segment joining the centers of the read elements R2, R3, and the line segment joining the centers of the read elements R1, R3 form a triangle.

Of the three read elements R1, R2, R3, the read element R1 can be regarded as one on the master side, and either the read element R2 or the read element R3 can be regarded as one on the slave side. That is, the read element R1 may be regarded as one on the master side while the read element R2 may be regarded as one on the slave side, or the read element R1 may be regarded as one on the master side while the read element R3 may be regarded as one on the slave side. In the case where the read element R1 is regarded as one on the master side while the read element R2 is regarded as one on the slave side, information of the servo pattern can be acquired using the read signals φR1, φR2 of the two read elements R1, R2. In the case where the read element R1 is regarded as one on the master side while the read element R3 is regarded as one on the slave side, information of the servo pattern can be acquired using the read signals φR1, φR3 of the two read elements R1, R3.

For example, when the head 122 is located over a track TRK_h in the middle circumference zone MD, as shown in FIG. 3C, the read element R2 has an offset amount Tr of almost zero (≈0) relative to the read element R1, and as shown in FIG. 20C, the read element R3 has a positive offset amount Tr' (>0) relative to the read element R1. Thus, when the head 122 is located over the track TRK_h in the middle circumference zone MD, if the read signal φR3 is used instead of the read signal φR2, with using the offset amount Tr', the detection of the N phase can suffice for the detection of the off-track amount of the head 122'. For example, θr is obtained from the expression 1 having Tr' substituted for Tr, and N1 from the read signal φR1, N2 from the read signal φR2, and the obtained θr are substituted into the expression 5 to obtain sin θ, and cos θ (=N1) and the obtained sin θ can be substituted into the expression 2 to obtain the off-track amount offtrk of the head 122'.

In this case, at S23 of FIG. 11, the controller 130 can measure the offset amount Tr' as well as the offset amount Tr. In measuring the offset amount Tr', the forced R1 position calculation flag is set, and the controller 130 performs the detection of the read element R1 position according to the forced R1 position calculation flag to acquire the current head position Pos1 of the read element R1. Then the forced R3 position calculation flag is set, and the controller 130 performs the detection of the read element R3 position according to the forced R3 position calculation flag to acquire the current head position Pos2 of the read element R3. The controller 130 can obtain the offset amount Tr' as the difference in head position between Pos1 and Pos2 as shown by the expression 6.

Further, at S3 of FIG. 9, the post-code recording is performed as shown in FIGS. 21A to 21F. That is, at a radial position to be in the middle circumference zone MD, as well as at a radial position to be in the outer circumference zone OD and at a radial position to be in the inner circumference zone ID, a post-code is post-recorded immediately after the N-phase burst pattern (Null N). By this means, at each of the radial position to be in the outer circumference zone OD, the radial position to be in the middle circumference zone MD, and the radial position to be in the inner circumference zone ID, part (most part) or all of the Q-phase burst pattern (Null Q) is erased.

Thus, by making the servo burst regions Rbst of the tracks in the zones ID, MD, and OD in the disk medium 111 be formed substantially of only the N-phase burst pattern, the data capacity of the disk medium 111 can be further improved.

Figure 21A:
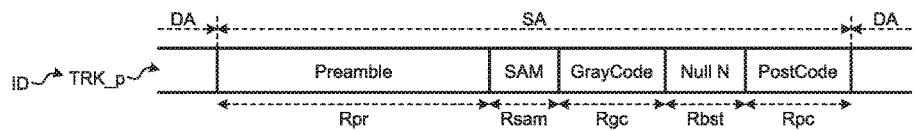
FIGS. 21A to 21F are diagrams illustrating the configuration of a disk medium in the third embodiment.
Figure 21B:
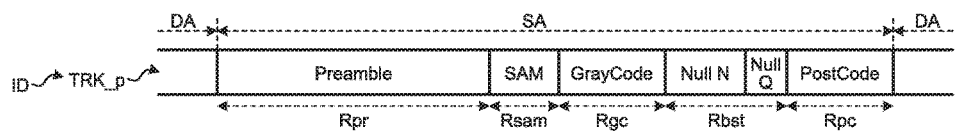
Figure 21C:
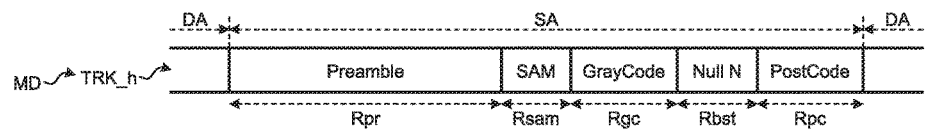
Figure 21D:
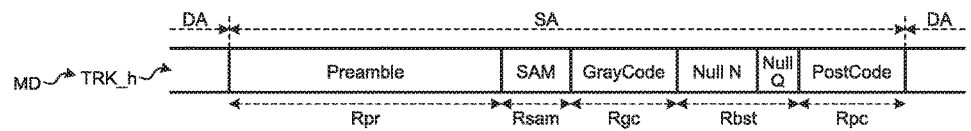
Figure 21E:
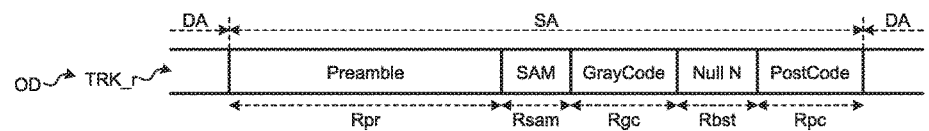

For example, as shown in FIGS. 21A, 21C, 21E, the servo burst region Rbst of each track (e.g., tracks TRK_r, TRK_h, TRK_p) in the zones ID, MD, and OD includes the N-phase burst pattern (Null N) and not the Q-phase burst pattern (Null Q). The servo burst region Rbst of each of substantially all the tracks in the disk medium 111 includes the N-phase burst pattern (Null N) and not the Q-phase burst pattern (Null Q).

Figure 21F:
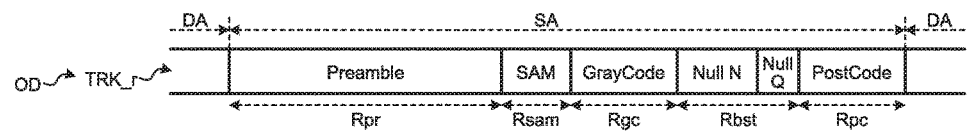

Or, as shown in FIGS. 21B, 21D, 21F, the servo burst region Rbst of each track (e.g., tracks TRK_r, TRK_h, TRK_p) in the zones ID, MD, and OD includes the N-phase burst pattern (Null N) and the Q-phase burst pattern (Null Q) considerably shorter in bit length than the N-phase burst pattern. The servo burst region Rbst of each of substantially all the tracks in the disk medium 111 includes the N-phase burst pattern (Null N) and the Q-phase burst pattern (Null Q) considerably shorter in bit length than the N-phase burst pattern. That is, the servo burst region Rbst of each track in the zones ID, MD, and OD includes the Q-phase burst pattern (Null Q) having a bit length considerably shorter than the bit length corresponding to the pulse width (see FIG. 4B) of the Q-phase demodulation window WQ of the gate signal. The servo burst region Rbst of each of substantially all the tracks in the disk medium 111 includes the Q-phase burst pattern (Null Q) having a bit length considerably shorter than the bit length corresponding to the pulse width (see FIG. 4B) of the Q-phase demodulation window WQ of the gate signal.

Further, in the production process, when the read signals φR1, φR3 of the two read elements R1, R3 are read, such as when the head 122' is located over the middle circumference zone MD, the read channel 131 shown in FIG. 7 adopts the read signal φR3 acquired during periods when the demodulation window WN or WQ is active as N2, Q2 respectively, and thus the controller 130 can obtain the offset amount Tr'. Yet further, after shipment, when the read signals φR1, φR3 of the two read elements R1, R3 are read, such as when the head 122' is located over the middle circumference zone MD, the read channel 131 shown in FIG. 7 adopts the read signal φR3 acquired during periods when the demodulation window WN is active as N2, Q2 respectively, and thus the controller 130 can obtain the off-track amount of the head 122' using the offset amount Tr'.

In addition, in the production process, when the master side read element is changed among the three read elements R1, R2, R3 of the head 122, the gray code read by the master side read element is changed, which can cause the discontinuity of obtained current head position.

Accordingly, when switching the read element used for the gray code demodulation (i.e., the master side read element), the radial distance CTS between read elements at radial position of the switching is pre-obtained as the offset correction information and then the offset correction information for the radial distance CTS is add-corrected to the demodulated head position.

Figure 22:
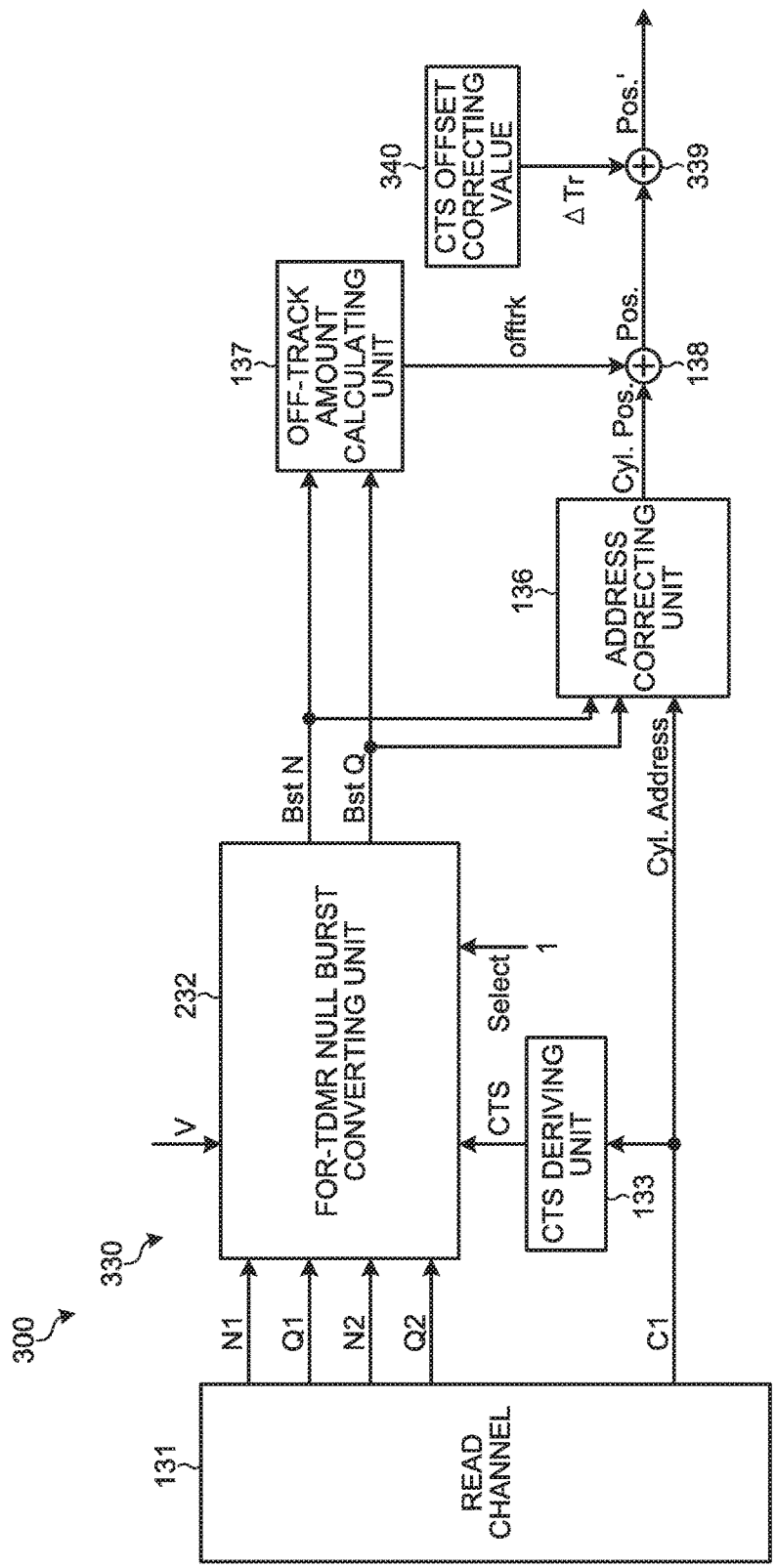
FIG. 22 is a diagram illustrating the configuration of a controller in the third embodiment.

For example, the disk device 300 has the controller 330 as depicted in FIG. 22 in substitute for the controller 230 (see FIG. 15). FIG. 22 illustrates the configuration of the controller 330. The controller 330 further has a CTS offset correcting value 340 and an adder 339.

The CTS offset correcting value 340 is a memory unit storing the correction amount for correcting, when performing the switching, the discontinuity error of detection position by CTS between the master read elements before/after the switching. The offset correction amount ΔTr in the CTS offset correcting value 340 can be set to be updated at the time of switching from one read element to another read element when performing seeking operation.

Figure 23:
FIG. 23 is a diagram illustrating a data structure of an offset correction value in the third embodiment.

FIG. 23 illustrates which two read elements are selected from three read elements at each radial position. In the present embodiment, data region is divided into 5 zones and the selection is performed such that in order to minimize the phase detection noise, for the servo pattern, radial distance CTS between read elements has nearly 90 degree difference as phase difference of the servo pattern. The radial position section 341b corresponds to radial position of 32 data zones. It is shown that, at radial position from data zone 0 to data zone 3, the master side read element 341c generating N1, C1 signal uses read element R2 and slave side read element 341d generating N2 uses read element R3. The offset amount 341e at this ID region is constantly CTS12Z4 and the CTS offset correcting value 340 holds this correction amount. It should be noted that CTS12Z4 is radial distance between read element R1 and read element R2 at boundary radial position of data zone 3 and data zone 4. The offset amount 341e at OD region is constantly CTS12Z30 and the CTS offset correcting value 340 holds this correction amount. It should be noted that CTS12Z30 is radial distance between read element R1 and read element R2 at boundary radial position of data zone 29 and data zone 30. When switching from ID region to MD region, along with the switching of the read elements, to the CTS offset correcting value 340, the offset amount 341e is loaded, which can set the offset amount ΔTr as 0. Inversely, When switching from MD region to ID region, to the CTS offset correcting value 340, the offset amount 341e is loaded, which can set the offset amount ΔTr as CTS12Z4.

Although the switching of the master side read elements can cause discontinuous change of running radial position of C1 and N1 for read element by an amount corresponding CTS, in synchronous with the switching of the master side read element, appropriate update setting of CTS offset correcting value 340 enables the correction of discontinuity component of detection position.

The adder 138 provides the current head position Pos to the adder 339. The CTS offset correcting value 340 provides the offset amount ΔTr to the adder 339. The adder 339 adds the current head position Pos with the offset amount ΔTr to generate the corrected current head position Pos'.

As such, in the third embodiment, the disk medium 111 is formed such that the servo burst regions Rbst of tracks in each zones ID, MD, OD is formed substantially of only the N-phase burst pattern. By this means, the area of the data areas DA in the disk medium 111 can be further increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
 a head including a first read element and a second read element; and
 a disk medium partitioned into a plurality of zones,
 wherein the plurality of zones include:
  a first zone including a plurality of tracks on each of which a servo area and a data area are placed, a servo burst region in the servo area from which to detect the amount of off-track of the head from the center of a track, having a first bit length; and
  a second zone including a plurality of tracks on each of which a servo area and a data area are placed, a servo burst region in the servo area from which to detect the amount of off-track of the head from the center of a track, having a second bit length shorter than the first bit length.

2. The disk device according to claim 1, wherein
 the servo burst region in the first zone includes a first burst pattern and a second burst pattern, and
 wherein the servo burst region in the second zone includes the first burst pattern and does not include the second burst pattern.

3. The disk device according to claim 2, wherein
 a phase that the second burst pattern has is different from a phase that the first burst pattern has.

4. The disk device according to claim 1, wherein
 the servo burst region in the first zone includes a first burst pattern and a second burst pattern, and
 wherein the servo burst region in the second zone includes the first burst pattern and the second burst pattern shorter in bit length than the second burst pattern in the first zone.

5. The disk device according to claim 4, wherein
 a phase that the second burst pattern has is different from a phase that the first burst pattern has.

6. The disk device according to claim 1 further comprising a position detector switching a first process and a second process,
 the first process being a process of detecting a current head position by obtaining an offtrack amount of the head in accordance with detection results of the first burst pattern and the second burst pattern,
 the second process being a process of detecting a current head position by obtaining an offtrack amount of the head in accordance with detection result by the first read element of the first burst pattern, detection result by the second read element of the first burst pattern, radial offset amount between the first read element and the second read element.

7. The disk device according to claim 6, wherein
 the offset amount is an amount calculated, based on physical positional relationship between read elements and a velocity of the head, as an offset of running trajectory between read elements.

8. The disk device according to claim 6, wherein
 the position detector performs the first process when the head is located in the first zone, and performs the second process when the head is located in the second zone.

9. The disk device according to claim 6, wherein
 the position detector performs, within the first zone, a switching from the first process to the second process when the head is going to move from the first zone to the second zone.

10. The disk device according to claim 6, wherein
 the position detector performs, within the first zone, a switching from the second process to the first process when the head is going to move from the second zone to the first zone.

11. The disk device according to claim 1, wherein
 a servo track pitch in the first zone is narrower than a servo track pitch in the second zone.

12. The disk device according to claim 1, wherein
 the absolute value of the amount of an offset along a radial direction between the center of the first read element and the center of the second read element when the head is located over the first zone, is greater than the absolute value of the amount of an offset along the radial direction between the center of the first read element and the center of the second read element when the head is located over the second zone.

13. A disk device comprising:
a head including a first read element, a second read element, and a third read element placed offset from a straight line joining the centers of the first and second read elements; and
a disk medium including a plurality of tracks,
wherein a servo area and a data area are placed on each of the plurality of tracks,
wherein the servo area includes a servo burst region from which to detect the amount of off-track of the head from the center of a track, and
wherein the servo burst region includes a first burst pattern and not a second burst pattern having a phase different from the first burst pattern, or includes the first burst pattern and the second burst pattern shorter in bit length than the first burst pattern.

14. The disk device according to claim 13 further comprising a position detector that selects two read elements among the first to third read elements in response to radial position, reads, by one read element of the two read elements as a master read element, address information and the first burst pattern from the servo region to acquire a first burst detection result, reads, by another read element of the two read elements as a slave read element, the first burst pattern from the servo region to acquire a second burst detection result, and detects a current head position by obtaining an offtrack amount of the head in accordance with the first burst detection result, the second burst detection result and radial offset amount between the master read element and the slave read element.

15. The disk device according to claim 14 wherein
the offset amount is an amount calculated, based on physical positional relationship between the master read element and the slave read element and a velocity of the head, as an offset of running trajectory between the master read element and the slave read element.

16. The disk device according to claim 14 wherein
the position detector corrects, in response to a change of the master read element by the selection of the two read elements, the obtained offtrack amount by a correction value corresponding to radial distance between the master read element before the change and the master read element after the change to acquire the current head position.

17. The disk device according to claim 13, wherein
a servo track pitch in the first track is narrower than a servo track pitch in the second track.

18. A method of manufacturing a disk device including a head having a plurality of read elements and a disk medium, comprising:
recording a servo pattern including a first burst pattern and a second burst pattern and forming a servo area including a servo burst region in which the first burst pattern and the second burst pattern are recorded at each of a plurality of radial positions of the disk medium;
for each of the plurality of radial positions, obtaining the amounts of offsets between the plurality of read elements according to results of detecting the first burst pattern and the second burst pattern by the plurality of read elements; and
erasing the second burst patterns from the servo burst regions at not less than some of the plurality of radial positions based on the amounts of offsets between the plurality of read elements at each of the plurality of radial positions.

19. The method of manufacturing the disk device according to claim 18, wherein
the plurality of read elements include:
a first read element; and
a second read element,
wherein the obtaining of the amounts of the offsets includes, for each of the plurality of radial positions, taking a difference between the position of the first read element that agrees with results of detecting the first and second burst patterns by the first read element and the position of the second read element that agrees with results of detecting the first and second burst patterns by the second read element to obtain the amount of an offset between the first and second read elements, and
wherein the erasing of the second burst patterns includes not erasing the second burst patterns from the servo burst regions in a first zone of a plurality of zones into which the plurality of radial positions are divided but erasing the second burst patterns from the servo burst regions in a second zone based on the amount of an offset between the first and second read elements at each of the plurality of radial positions.

20. The method of manufacturing the disk device according to claim 18, wherein
the plurality of read elements include:
a first read element;
a second read element; and
a third read element placed offset from a straight line joining the centers of the first and second read elements,
wherein the obtaining of the amounts of the offsets includes, for each of the plurality of radial positions, taking a difference between the position of the first read element that agrees with results of detecting the first and second burst patterns by the first read element and the position of the second read element that agrees with results of detecting the first and second burst patterns by the second read element to obtain the amount of an offset between the first and second read elements, and, for each of the plurality of radial positions, taking a difference between the position of the first read element that agrees with results of detecting the first and second burst patterns by the first read element and the position of the third read element that agrees with results of detecting the first and second burst patterns by the third read element to obtain the amount of an offset between the first and third read elements, and
wherein the erasing of the second burst patterns includes erasing the second burst pattern from the servo burst region at each of the plurality of radial positions based on the amount of an offset between the first and second read elements and the amount of an offset between the first and third read elements at each of the plurality of radial positions.

* * * * *